US012590923B2

(12) United States Patent　　　(10) Patent No.: US 12,590,923 B2
Greenizen et al.　　　　　　　　(45) Date of Patent: Mar. 31, 2026

(54) REMOVAL TOOL FOR EXTRACTING A SAMPLE WELL COMB FROM ELECTROPHORETIC GELS

(71) Applicant: EMD Millipore Corporation, Burlington, MA (US)

(72) Inventors: Kurt E. Greenizen, Atkinson, NH (US); Ryan Amara, Tewksbury, MA (US); Christopher A. Scott, Westford, MA (US); Paul Sydlowski, Danvers, MA (US); Michael Miller, North Andover, MA (US); Kelly Wolfe, Arlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 170 days.

(21) Appl. No.: 18/533,928

(22) Filed: Dec. 8, 2023

(65) Prior Publication Data

US 2024/0192166 A1　　Jun. 13, 2024

Related U.S. Application Data

(60) Provisional application No. 63/386,977, filed on Dec. 12, 2022.

(51) Int. Cl.
　G01N 27/447　　　(2006.01)
　B65D 23/10　　　(2006.01)
　A47J 45/07　　　(2006.01)

(52) U.S. Cl.
　CPC ....... G01N 27/44743 (2013.01); B65D 23/10 (2013.01); A47J 45/07 (2013.01)

(58) Field of Classification Search
　CPC ..... G01N 27/44743; A47J 45/00; A47J 45/07; B65D 23/10–106; B65D 23/12
　See application file for complete search history.

(56) References Cited

U.S. PATENT DOCUMENTS

| | | | | | |
|---|---|---|---|---|---|
| 2,860,000 | A | * | 11/1958 | Marcheski | A47J 45/10 294/169 |
| 4,846,518 | A | * | 7/1989 | Hamel | A63H 3/003 446/268 |
| 5,164,065 | A | * | 11/1992 | Bettencourt | G01N 27/44743 204/619 |
| 5,284,565 | A | * | 2/1994 | Chu | G01N 27/44743 204/619 |

(Continued)

*Primary Examiner* — Alexander S Noguerola
(74) *Attorney, Agent, or Firm* — EMD Millipore Corporation

(57) ABSTRACT

A removal tool for sample well combs that is configured to aid in the extraction of a sample well comb from an electrophoresis gel. The removal tool may be either removably coupled to the sample well comb or may be permanently affixed to the sample well comb in order to provide a surface/region that is more easily graspable by a user to aid in the extraction of the sample well comb. The removal tool may include one or more engagement members that may be at least partially disposed within an opening of the sample well comb to couple the removal tool to the sample well comb. The removal tool may also include a mechanism that is configured to impart extraction forces to a surface in proximity to the sample well comb to further aid in the extraction of the sample well comb.

20 Claims, 33 Drawing Sheets

(56)           References Cited

U.S. PATENT DOCUMENTS

| 5,843,295 | A | * | 12/1998 | Steiner | ............. | G01N 27/44743 |
| | | | | | | 204/620 |
| 6,136,172 | A | * | 10/2000 | Renfrew | .......... | G01N 27/44704 |
| | | | | | | 204/620 |
| 2003/0080574 | A1 | * | 5/2003 | Ngo | ........................ | A47J 45/10 |
| | | | | | | 294/27.1 |

* cited by examiner

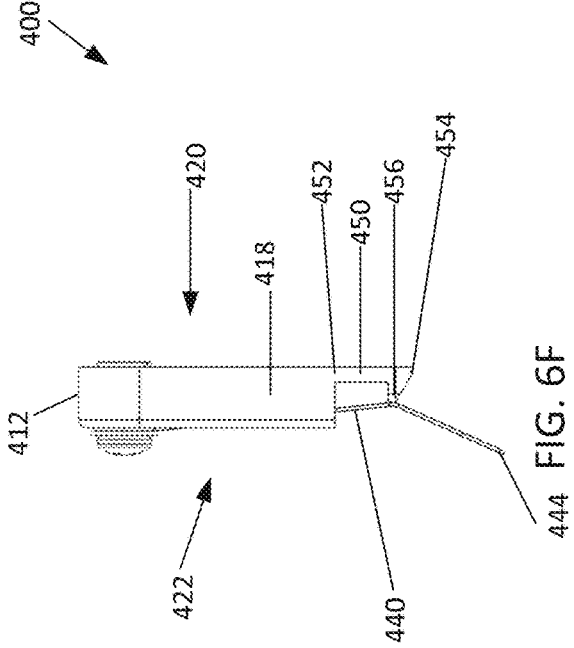
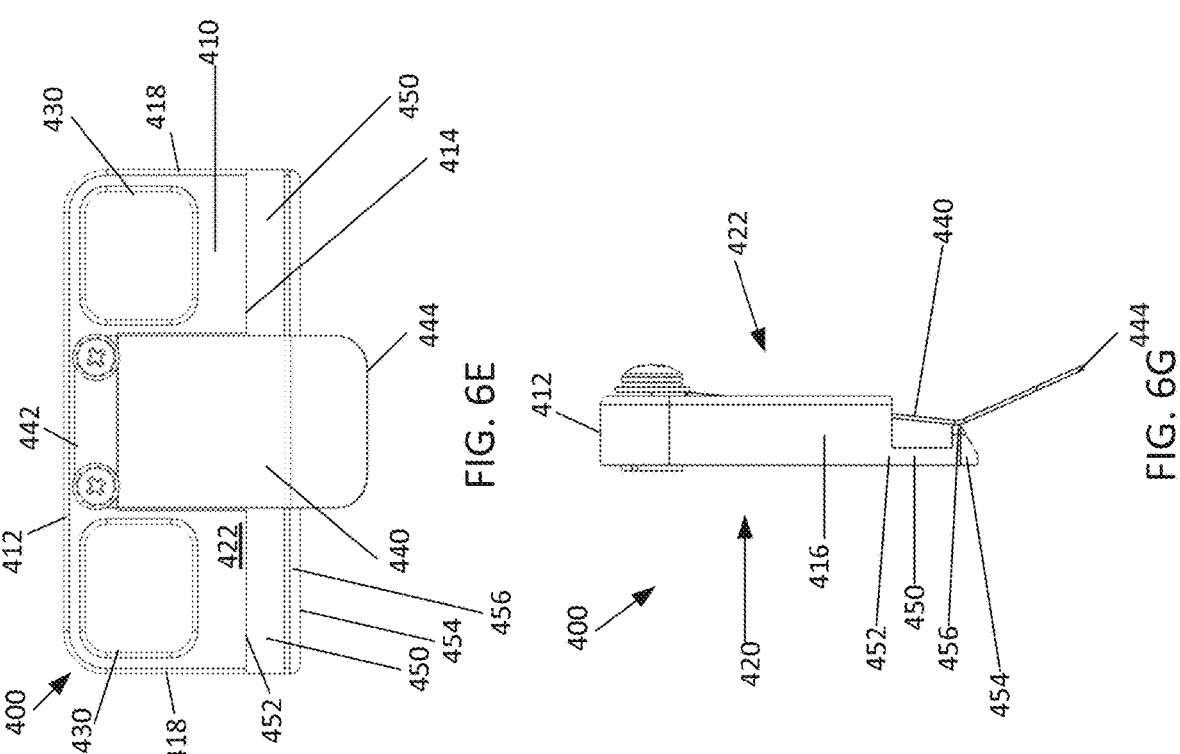

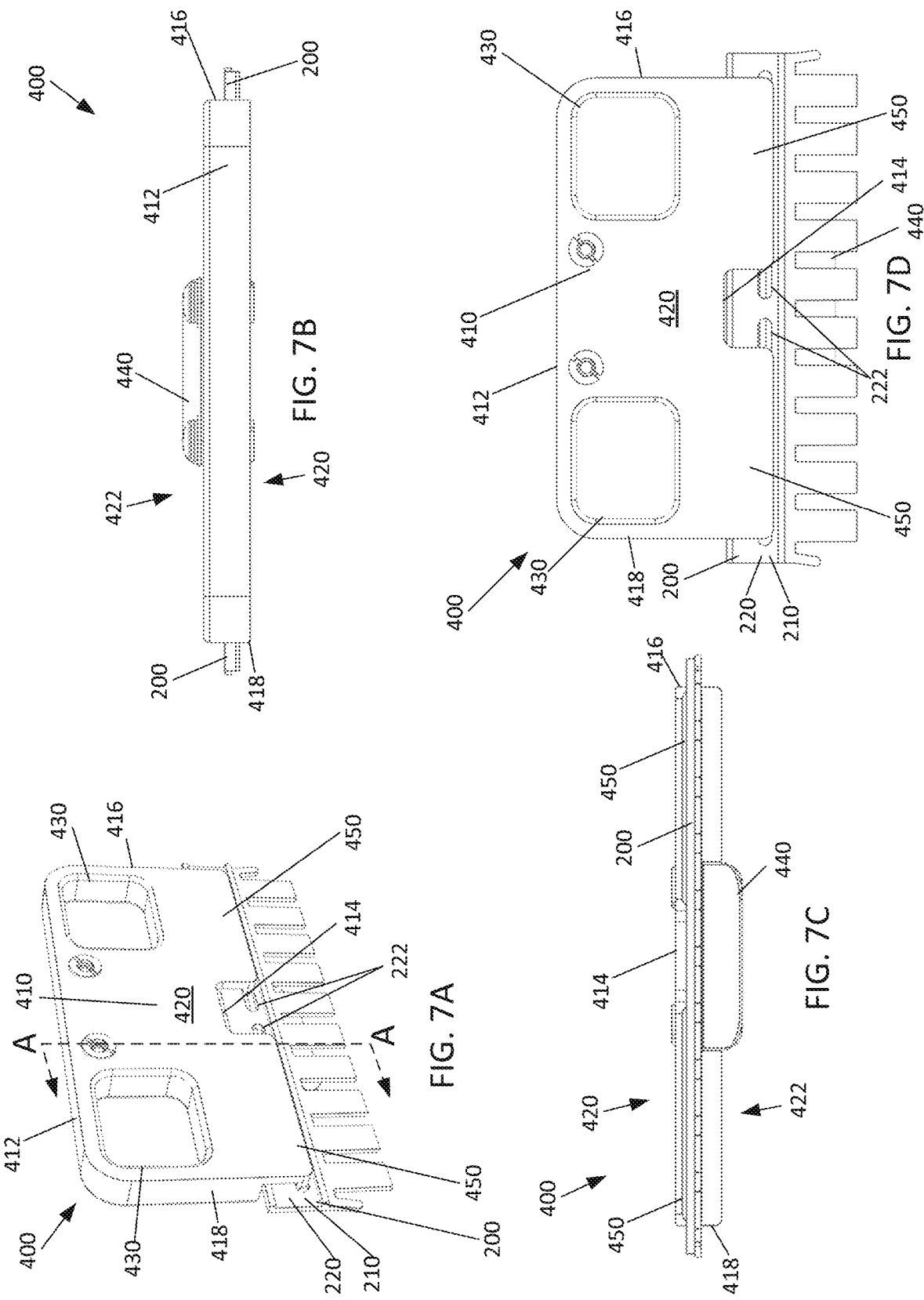

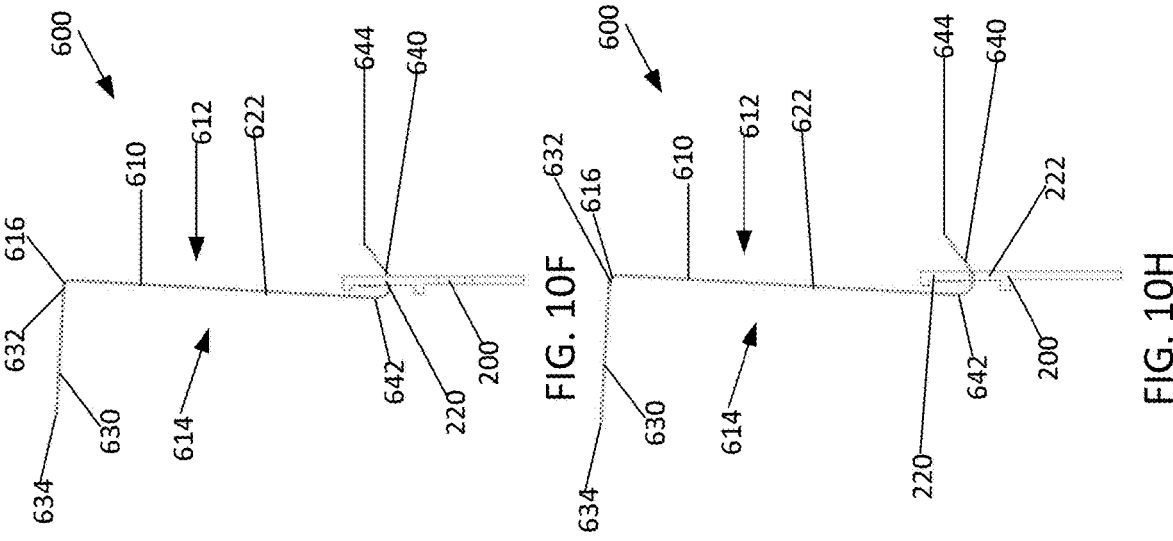
FIG. 10F
FIG. 10H
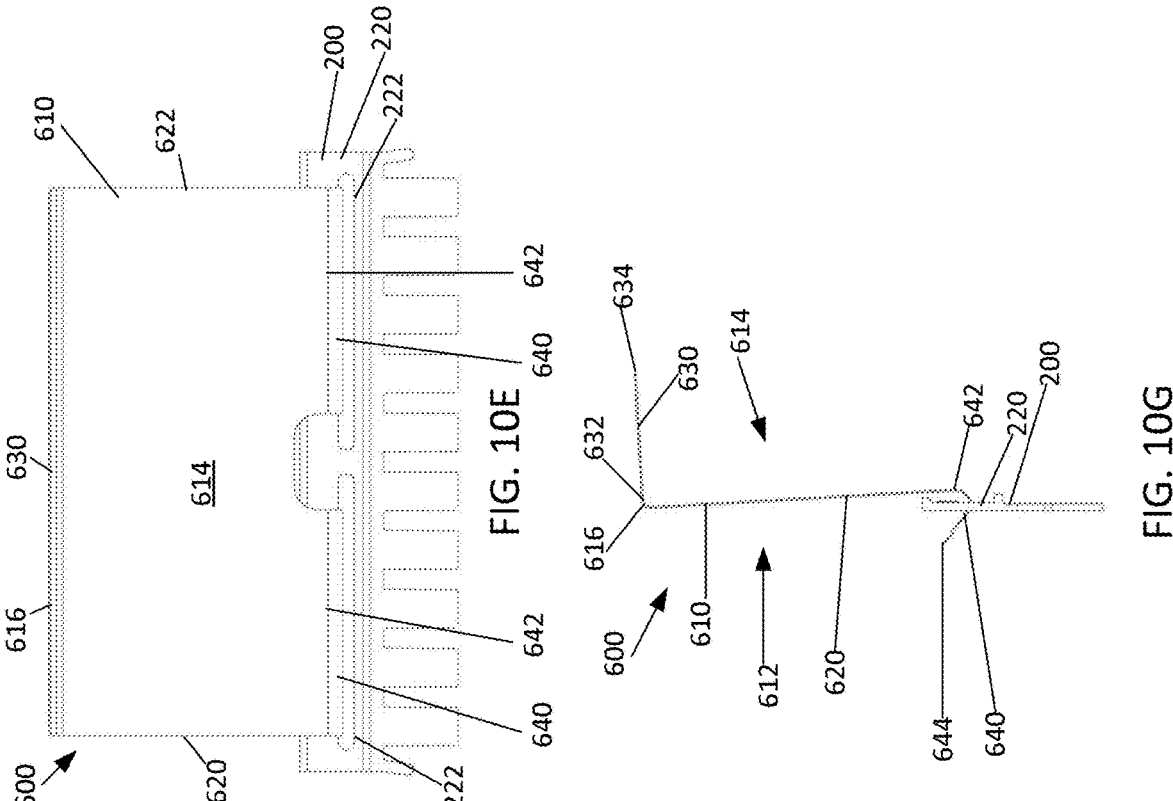
FIG. 10E
FIG. 10G

REMOVAL TOOL FOR EXTRACTING A SAMPLE WELL COMB FROM ELECTROPHORETIC GELS

CROSS-REFERENCE TO RELATED APPLICATIONS

This present application claims priority to U.S. Provisional Patent Application No. 63/386,977, entitled "REMOVAL TOOL FOR EXTRACTING A SAMPLE WELL COMB FROM ELECTROPHORETIC GELS," and filed on Dec. 12, 2022, the disclosure of which is incorporated herein by reference in its entirety for all purposes.

TECHNICAL FIELD

The present disclosure is directed generally toward electrophoresis, and, in particular, a removal tool for, and method of extracting, the sample well comb in a polymerized electrophoretic gel.

BACKGROUND OF THE INVENTION

The use of gel electrophoresis is currently the ubiquitous technique for the separation of biological materials. Non-biological materials can also be separated using gels or other chromatographic supports as well, but the scope of effort with regard to biologicals is greater. Typical applications include separation of nucleic acid fragments of various sizes either in the context of sequence determination; in the detection of polymorphisms; or verification of sizes in other contexts. Also frequently conducted are separations of proteins, glycoproteins, protein fragments and application of gel separations as verification of homogeneity or purity, identification of post translational modifications and confirmation of molecular weight.

In all of these procedures, mixed samples of biological entities are applied to electrophoretic gels and the components are separated by application of an electric field across the gel. Regardless of the manner in which the gel is developed, the resulting pattern of migration of the substances contained in the sample must be detected in some manner. To conduct this detection after the gel is developed, the gel is stained by incubating the gel in the stain of choice for a period of time followed by a destaining process where the destaining composition is driven by the stain choice. The stained gel's protein bands are compared to a known protein ladder included as a sample on the gel to help determine the protein of interest's molecular weight. In some instances, additional information on the protein of interest is gained by further transfer of the protein of interest followed by immunodetection. Following the staining, typically the gel support is contacted with a blotting membrane to which the substances are transferred in the same pattern in which they appeared on the gel. The "spots" are then detected, at a minimum, by blocking the membrane with a protein or detergent solution to reduce non-specific binding (which otherwise leads to a high level of noise and low level of detection). Typical blocking agents include casein, bovine serum albumin (BSA), non-fat dry milk (generally about 1-5%) in a Tris buffer saline solution with TWEEN® surfactant (TBS-T solution) or phosphate buffer saline solution with TWEEN® surfactant (PBS-T solution). The biological entity is then incubated with an antibody specific for the antigen on the membrane. The membrane is then extensively washed to remove any contaminants, unbound blocking proteins or antibodies and the like. The membrane is then treated and incubated with a secondary enzyme-, radioisotope-, fluorfluor-, or biotin-conjugated antibody specific for the primary antibody. The membrane is extensively washed again to remove any unbound secondary antibody. Then a detection reagent, generally a chromogenic, chemiluminescent, fluorescent, radiological, or streptavidin-labeled material, is applied which either binds to, or is a substrate of the enzyme-conjugate. Lastly, the appropriate detection device is used to determine the presence, absence, position, quantity, etc. of the biological entity.

Systems (best illustrated in FIG. 1) for hand casting an electrophoresis gel are commercially available and generally encompass a variety of different approaches, including single, dual and multicast systems. Most hand cast systems require the user to set up the system by assembly of a series of variable sized glass plates (best illustrated in FIG. 2, but also shown in FIG. 1) with spacers appropriate to the thickness of the required gel that is to be cast (e.g., 0.75 mm, 1.0 mm, and 1.5 mm). The desired gel thickness may be determined by the sample volume required for the electrophoresis process. The glass plates can be very fragile and subject to chipping and breakage during cleaning, handling and/or storage. Glass is the most common material for gel hand-casting because it provides an optimal reusable interface with the acrylamide for both gel polymerization and removal. Glass plates are also less susceptible to surface damage during cleaning than other materials such as plastic. Most non-reusable or disposable hand casting systems utilize treated plastics which can be advantageous as a release surface with the cast gels.

These systems are cumbersome to manage and require large numbers of components which must be aligned properly and loaded into a holder (see FIG. 1) which mechanically compresses the glass plates together and forces the glass against a gasket or the like to prevent acrylamide from leaking out of the system and the cassette assembly. The gaskets used in these systems are of variable designs unique to the system being used. These gaskets or seals are exposed to the liquid acrylamide and often can become infused with the acrylamide, can be difficult to clean for subsequent uses, and can cause leaking issues. Loading the cassette components into the system requires precise alignment and users customarily test the assembly with deionized water to ensure there are not leaks prior to casting with acrylamide. The deionized water must be removed before casting. If leaks are detected, the assembly and cassette components must be adjusted, and the process repeated.

Once the system has been properly assembled, the first step in the casting process begins by injecting (e.g., usually by pipette) liquid acrylamide resolving gel into the cassette. In the single and dual systems, this requires the user to inject into what is a narrow opening at the top of each individual cassette. Multicast systems may allow the users to flood the entire stack simultaneously but produce an excess of acrylamide waste which must be cleaned after the process is completed.

Visibility into the cassette is important to achieve the desired height of the resolving gel which is advantageous in the single cassette systems but not achievable beyond the first couple of layers in a multicast system. When creating the acrylamide resolving gel formulation, ammonium persulfate (hereinafter "APS") and Tetramethylethylenediamine (hereinafter "TEMED") are mixed with the acrylamide to catalyze the polymerization of the gel. After injecting this liquid acrylamide formulation into the cassette(s), the user must wait 30-45 minutes for the resolving gel to completely polymerize.

The second step in the casting process involves injecting the acrylamide stacking gel into each cassette, again usually by pipette. This also requires the user to inject into the narrow opening at the top of each individual cassette. Once the stacking gel has been introduced into the cassette, the user inserts a sample well comb (best illustrated in FIGS. 4A and 4B) matched to the gel thickness. To enable the comb to be inserted into the cassette, the comb teeth which form the sample wells are slightly thinner than the space between the glass plates which forms the desired gel thickness. The combs are constructed with a number of teeth to form wells, the number of which is based on sample size and desired well volumes (common configurations are 10, 12 and 15 wells). To enable the comb to be inserted into the cassette, the comb "teeth," which form the sample wells, are slightly thinner than the space between the glass plates that form the desired gel thickness. Thus, while inserting the comb, it is important for it to be centered from side to side with respect to the cassette and remain secure both during and after the stacking gel cures. It is also important that the comb can be removed (for electrophoresis sample loading) without disruption of the polymerized wells. Traditionally, any acrylamide solution occupying the space between the glass plates and the comb does not cure and is rinsed out after removing the comb before sample introduction for the electrophoresis process.

Like the acrylamide resolving gel, the stacking gel often takes 30-45 minutes to cure. For each of the gels this is dependent on the reagents and their concentrations. As a result, modification of the reagents and concentrations has been demonstrated to allow for photopolymerization of the electrophoresis gels significantly cutting down on curing times for the user. However, when an acrylamide stacking gel is cured using photopolymerization, any stacking gel solution that may reside between the comb teeth and the glass may cure into a thin film within the wells, introducing variations into the sample wells from well to well and finished gel to gel. In addition, when using traditional hand cast and a photoinitiated/light curing polymerization processes, any stacking gel solution that may reside between the comb teeth and the glass may also adhere to the comb teeth. This may result in the creation of a vacuum suction effect when removing the sample well comb from the gel casting assembly. Traditional gel combs by necessity are low profile and this creates a situation wherein gripping and removal of the comb can be physically challenging. In addition, the force to remove the comb from the casting assembly can cause deformities to the sample wells such as damage to the dividing "fingers" of gel which define the individual sample wells.

It would be desirable to be able to remove a sample well comb from a gel casting assembly after the photoinitiated light curing of the gel without damaging or deforming the sample wells.

It is therefore an object of embodiments disclosed herein to provide a component/device that engages with the sample well comb and provides the user with a mechanical means of removing/extracting the sample well comb from the cured gel.

It is another object of embodiments disclosed herein to facilitate a mechanical advantage for removing the sample well comb by allowing smooth consistent force to be applied to remove the sample well comb.

It is yet another object of the embodiments disclosed herein to provide a component/device that is capable of interfacing with existing gel casting assemblies and sample well combs, while also providing an intuitive interaction for the user. These and other objects are achieved by the embodiments disclosed herein.

SUMMARY OF THE INVENTION

The present disclosure is directed towards a removal tool for sample well combs that is configured to aid in the extraction of a sample well comb from an electrophoresis gel. The removal tool may be either removably coupled to the sample well comb or may be permanently affixed to the sample well comb in order to provide a surface/region that is more easily graspable by a user to aid in the extraction of the sample well comb. The removal tool may include one or more engagement members that may be at least partially disposed within an opening of the sample well comb to couple the removal tool to the sample well comb. The removal tool may also include a mechanism that is configured to impart extraction forces to a surface in proximity to the sample well comb to further aid in the extraction of the sample well comb. The mechanism may be capable of applying a smooth consistent force to remove the sample well comb.

One embodiment of the removal tool for removing a sample well comb from an electrophoresis gel may include an upper portion and a lower portion. The upper portion may define a region to be gripped by a user. The lower portion may be coupled to the upper portion. The lower portion may further include at least one engagement member configured to be at least partially disposed within an opening in the sample well comb to couple the removal tool to the sample well comb. When the removal tool is coupled to the sample well comb, the removal tool may be configured to facilitate the removal of the sample well comb from an electrophoresis gel.

In some instances, the removal tool may be removably couplable to the sample well comb. In some further instances, the lower portion may further include an alignment member spaced from the at least one engagement member. In some even further instances, the removal tool may further include a clamp member disposed on either the upper portion or the lower portion. The clamp member may be configured to apply a clamping force with the at least one engagement member to an object disposed between the at least one engagement member and the clamp member. In some additional instances, the at least one engagement member may include a flange configured to be disposed within the opening of the sample well comb in order to removably couple the removal tool to the sample well comb. In addition, the at least one engagement member may extend upwardly at an angle with respect to the upper portion and the lower portion.

In even some further instances, the removal tool may further include a mechanism coupled to the upper portion of the removal tool, where the mechanism may be configured to extract the sample well comb from the electrophoresis gel. In some additional instances, the mechanism is a plunger, but in some other instances, the mechanism is a cam.

In some instances, the lower portion may include a first side and an opposite second side, and the at least one engagement member may be a projection extending outwardly from the second side of the lower portion. In some even further instances, the second side of the lower portion may be affixed to the sample well comb.

In yet another embodiment, the removal tool for removing a sample well comb from an electrophoresis gel may include a base portion and an engagement member. The base portion may have a first edge, a second edge, a top surface, and a bottom surface. The engagement member may be coupled to the first edge of the base portion and may extend downwardly below the bottom surface of the base portion. The engagement member may be configured to be at least partially disposed within an opening in the sample well comb to couple the removal tool to the sample well comb. When the removal tool is coupled to the sample well comb, the removal tool may be configured to facilitate the removal of the sample well comb from an electrophoresis gel.

In some instances, the engagement member may include a proximal end coupled to the first edge of the base portion and an opposite distal end that comprises a flange configured to be disposed within the opening of the sample well comb. In some even further instances, the removal tool may further include an alignment member coupled to the second edge of the base portion and extending downwardly below the bottom surface of the base portion. The alignment member may be spaced from the engagement member. In even some further instances, the removal tool may further include a plunger slidably coupled to the base portion. The plunger may be configured to apply a force to a glass plate disposed in proximity to the sample well comb when the removal tool is coupled to the sample well comb in order to extract the sample well comb from the electrophoresis gel. In some additional instances, the removal tool may further include a cam member rotatably coupled to the base portion. The cam member may be configured to apply a force to a glass plate disposed in proximity to the sample well comb when the removal tool is coupled to the sample well comb in order to extract the sample well comb from the electrophoresis gel.

In an even further embodiment, the removal tool for removing a sample well comb from an electrophoresis gel may include a planar portion, an engagement member, and a handle. The planar portion may be oriented substantially vertically, and may include a first side, an opposite second side, a top edge, and a bottom edge opposite the top edge. The engagement member may be coupled to the second side of the planar portion proximate to the bottom edge. The engagement member may be configured to be disposed within an opening of the sample well comb when the removal tool is coupled to the sample well comb. The handle may be coupled to the top edge of the planar portion.

In some instances, the engagement member may be coupled to the bottom edge of the planar portion and may extend upwardly at an acute angle with respect to the planar portion. In some further instances, the engagement member may be a projection that extends perpendicularly from the second side of the planar portion. In some even further instances, the removal tool may further include a clamp member coupled to the second side of the planar portion. The clamp member may be configured to apply a clamping force with the engagement member to an object disposed between the engagement member and the clamp member.

Other systems, devices, apparatuses, methods, features, and advantages will be, or will become, apparent to one with skill in the art upon examination of the following figures and detailed description. All such additional systems, devices, arrangements, mechanisms, assemblies, apparatuses, methods, features, and advantages are included within this description, are within the scope of the claimed subject matter.

BRIEF DESCRIPTION OF THE DRAWINGS

The apparatuses, systems, assemblies, devices, components, removal tools, and removal mechanisms presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts/steps throughout the different views.

FIGS. 6A-6G illustrate various views (perspective, top, bottom, front, rear, left, and right) of a second embodiment of a removal tool for the sample well comb illustrated in FIGS. 4A and 4B and in accordance with the present disclosure, the removal tool being removably couplable to the sample well comb.

FIGS. 7A-7G illustrate various views (perspective, top, bottom, front, rear, left, and right) of the removal tool illustrated in FIGS. 6A-6G being removably coupled to the sample well comb illustrated in FIGS. 4A and 4B and in accordance with the present disclosure.

FIG. 7H illustrates a cross-sectional view of the removal tool illustrated in FIGS. 6A-6G and the sample well comb illustrated in FIGS. 4A and 4B, where the removal tool is removably coupled to the sample well comb like that illustrated in FIG. 7A, the cross-sectional view being taken along line A-A in FIG. 7A.

FIGS. 10A-10G illustrate various views (perspective, top, bottom, front, rear, left, and right) of the removal tool illustrated in FIGS. 9A-9G being removably coupled to the sample well comb illustrated in FIGS. 4A and 4B and in accordance with the present disclosure.

FIG. 10H illustrates a cross-sectional view of the removal tool illustrated in FIGS. 9A-9G and the sample well comb illustrated in FIGS. 4A and 4B, where the removal tool is removably coupled to the sample well comb like that illustrated in FIG. 10A, the cross-sectional view being taken along line B-B in FIG. 10A.

DETAILED DESCRIPTION OF THE INVENTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
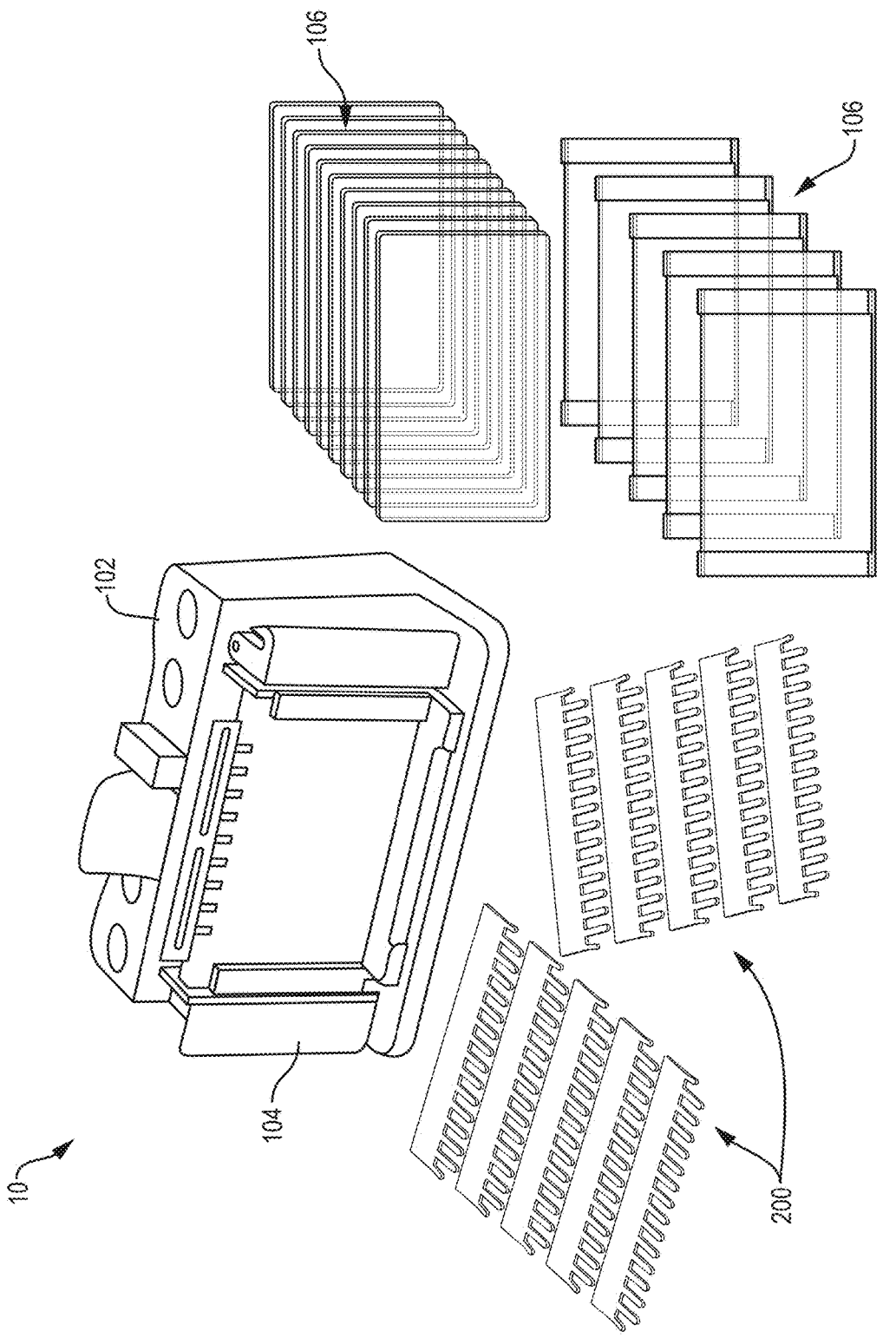
FIG. 1 illustrates a perspective/front view of a hand casting kit configured to hand cast electrophoresis gels.

Turning to FIG. 1, illustrated is a hand casting kit 10 configured facilitate the hand casting of electrophoresis gels.

Figure 2:
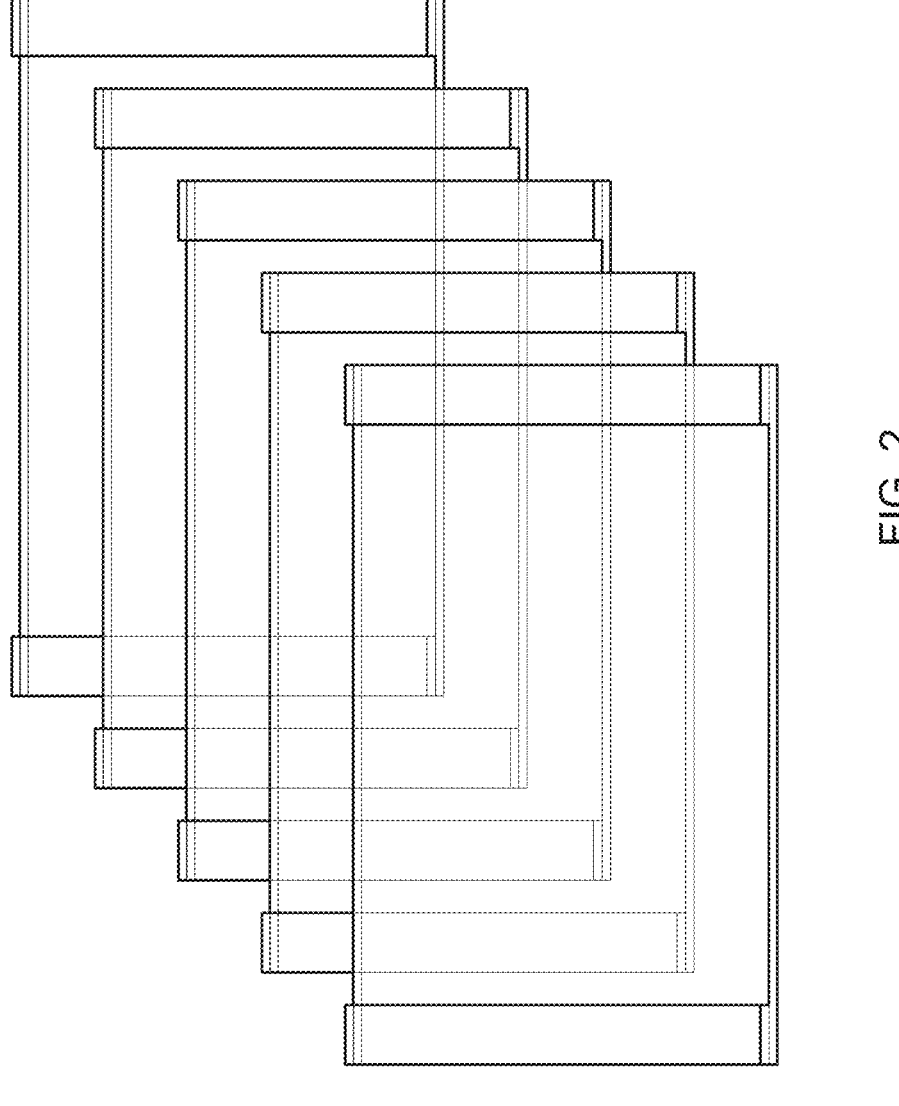
FIG. 2 illustrates a perspective of a plurality of glass plates that may be utilized in the hand casting kit illustrated in FIG. 1 to hand cast electrophoresis gels.

The hand casting kit 10 may include a caster base 102, a caster frame 104, and a plurality of glass plates 106, which are also illustrated in FIG. 2. The hand casting kit 10 may also include a plurality of sample well combs 200. As illustrated, the glass plates 106 may be aligned in the caster frame 104 with gaskets (not shown), which then may be supported by the caster base 102 in order to cast the electrophoresis gels. Once the glass plates 106 have been properly aligned and assembled within the caster frame 104, the caster frame 104 (containing the aligned glass plates 106) is placed on the caster base 102 so that a liquid acrylamide resolving gel can be injected (e.g., usually by pipette) into the space between the glass plates 106. Once the liquid acrylamide resolving gel is cured, an acrylamide stacking gel may be inserted into the space between the glass plates 106, again usually by pipette. As illustrated in FIG. 1, once the stacking gel has been introduced, a sample well comb may be disposed into the space between the glass plates 106.

Figure 3:
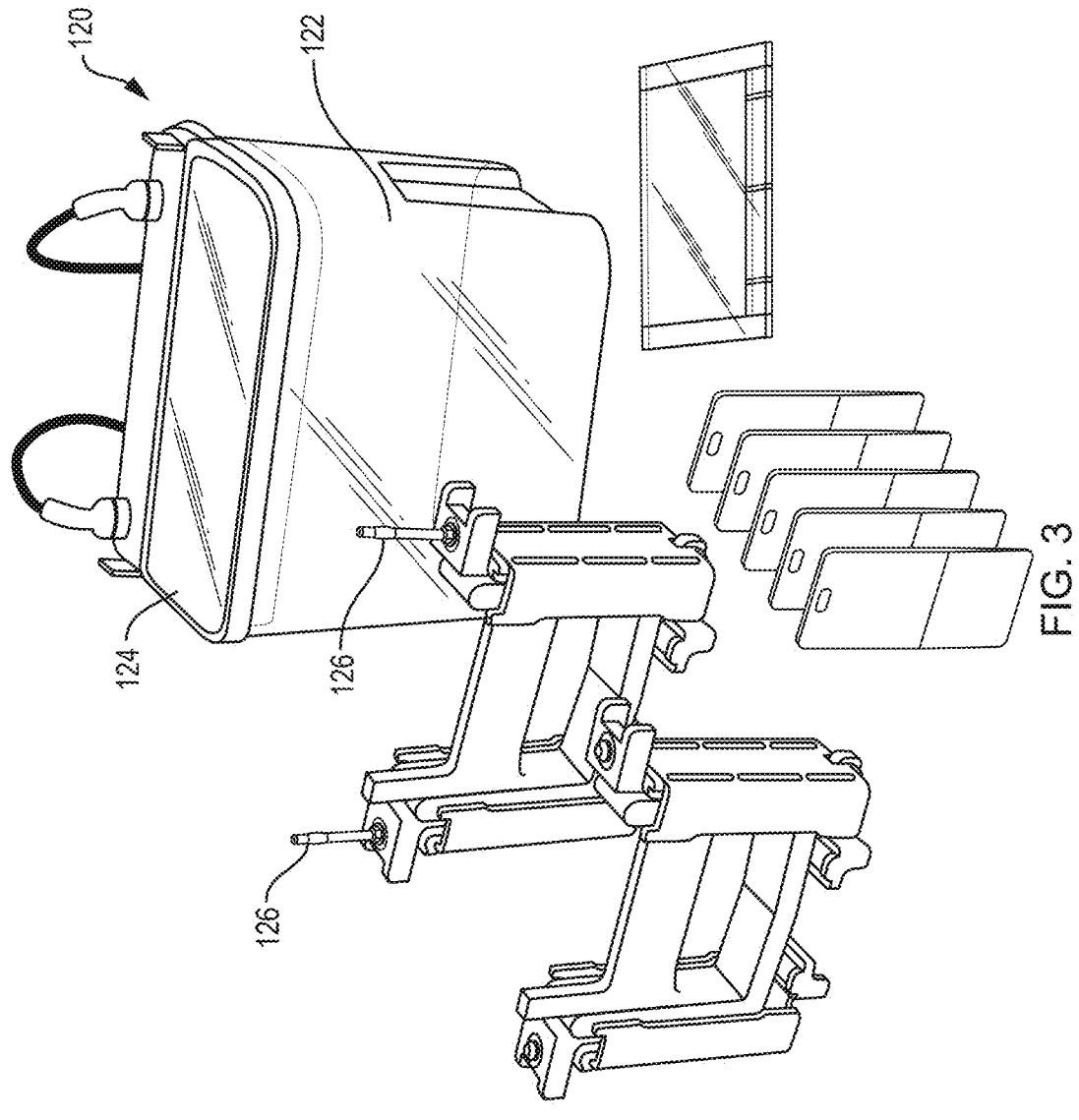
FIG. 3 illustrates a perspective view of electrophoresis gel tank that is configured to perform an electrophoresis process with electrophoresis gels, including those hand casted with the hand casting kit illustrated in FIG. 1, in order to separate molecules (e.g., DNA, RNA, proteins, etc.) on the basis of their size.

Turning to FIG. 3, illustrated is a gel tank system 120 configured to perform an electrophoresis process. The gel tank system 120 includes a gel tank 122 and a lid 124 for the gel tank 122. As illustrated, the lid 124 may include cables that are attached to the lid 124. The cables may contain metal leads that allow voltage to be transferred from a power supply to the electrode cores 126 when the electrode cores 126 are disposed within the gel tank 122. The electrode cores 126 may be configured to secure one or more electrophoresis gels via an electrode core gasket and core clamps. In addition, the electrode cores 126 may include electrode connector leads.

Figure 4A:
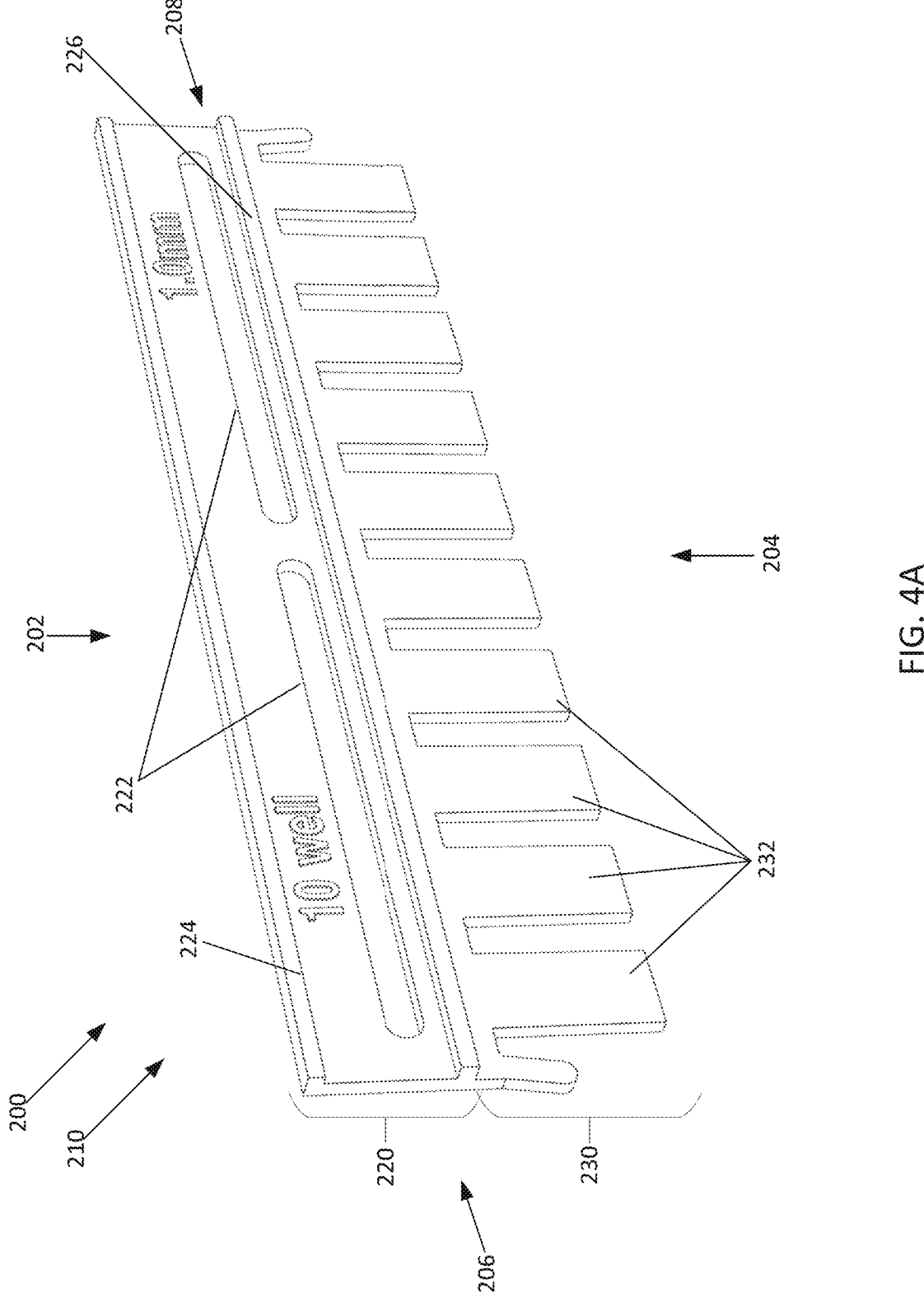
FIGS. 4A and 4B illustrate perspective views of a sample well comb configured to be used in an electrophoresis gel, including those hand casted with the hand casting kit illustrated in FIG. 1.
Figure 4B:
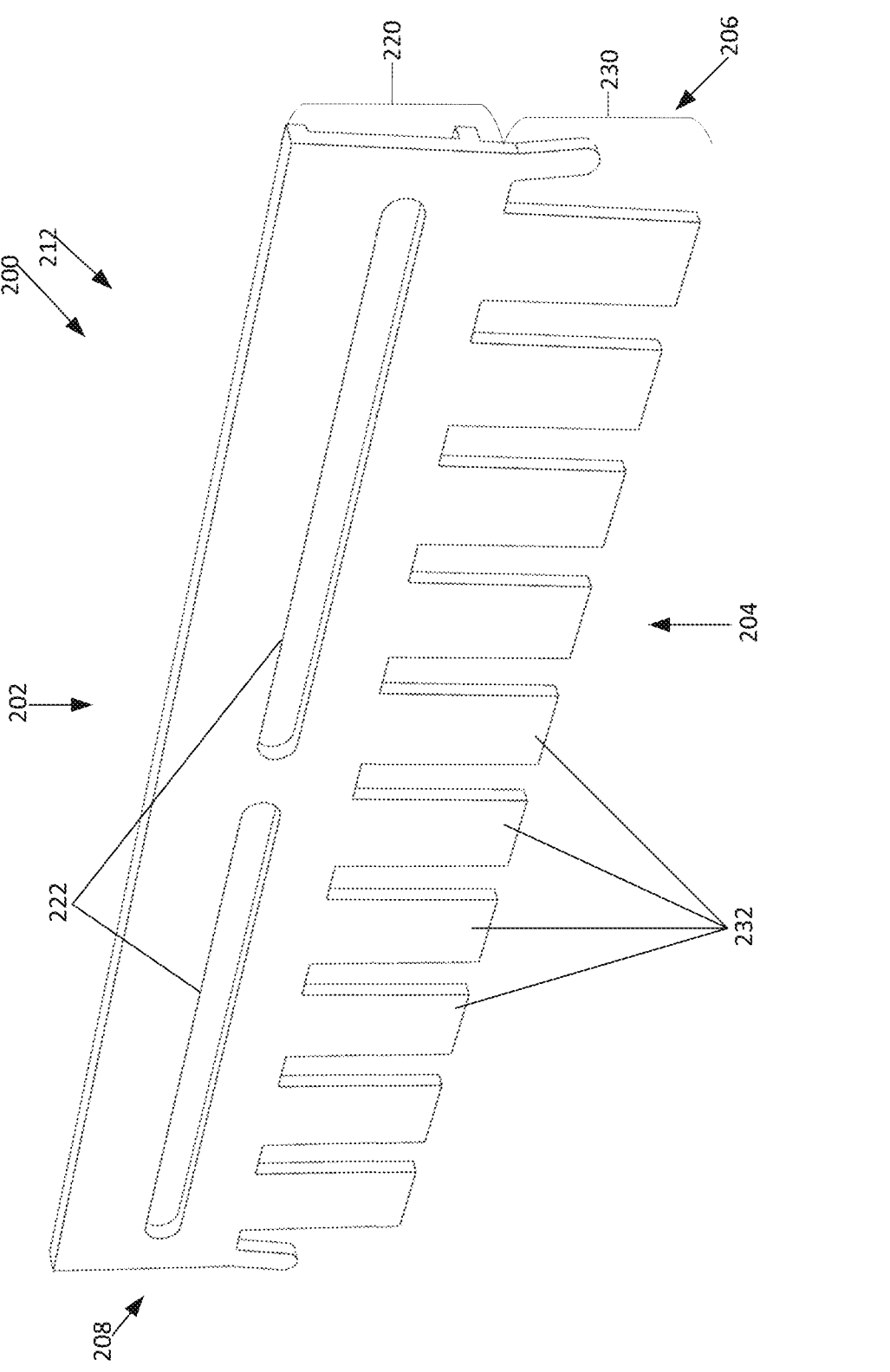

Turning to FIGS. 4A and 4B, illustrated are front and rear perspective views of a sample well comb 200. As illustrated, the sample well comb 200 may be substantially planar, and may include a top end 202, an opposite bottom end 204, a first edge 206 spanning between the top end 202 and the bottom end 204, and a second edge 208 opposite the first edge 208 and also spanning between the top end 202 and the bottom end 204. The sample well comb 200 may further include a first side 210 (illustrated in FIG. 4A), and an opposite second side 212 (illustrated in FIG. 4B). As further illustrated in FIGS. 4A and 4B, the sample well comb 200 may include an upper portion 220 and a lower portion 230. The upper portion 220 may form the top end 202 of the sample well comb 200 and at least partially form the first and second edges 206, 208 of the sample well comb 200. The lower portion 230 may form the bottom end 204 of the sample well comb 200 and at least partially form, with the upper portion 220, the first and second edges 206, 208 of the sample well comb 200. The lower portion 230, as further illustrated, may include a series of teeth 232 that are configured to form the wells in an electrophoresis gel.

Continuing with FIGS. 4A and 4B, the upper portion 220 may include one or more elongated openings 222, as well as upper and lower ridges 224, 226. The upper ridge 224 may be disposed above the openings 222 and may be oriented on the first side 210 and along the top end 202 of the sample well comb 200. The lower ridge 226 may be disposed below the openings 222, may be oriented on the first side 210, and may be located at the coupling of the upper portion 220 and the lower portion 230. The openings 222 may be disposed in the upper portion 220 more proximate to the lower ridge 226 than the upper ridge 224. The upper portion 220 may further include text (e.g., raised from the first side 210) disposed on the first side 210 between the upper ridge 224 and the openings 222. The text may indicate the number of teeth 232 included on the sample well comb 200 and/or the thickness of the sample well comb 200. As best illustrated in FIG. 4B, the second side 212 of the sample well comb 200 may be void of ridges (e.g., flat, smooth, substantially planar, etc.), unlike that of the first side 210, which enables the second side 212 of the sample well comb 200 to sit flush against a surface of a glass plate 106.

Figure 5:
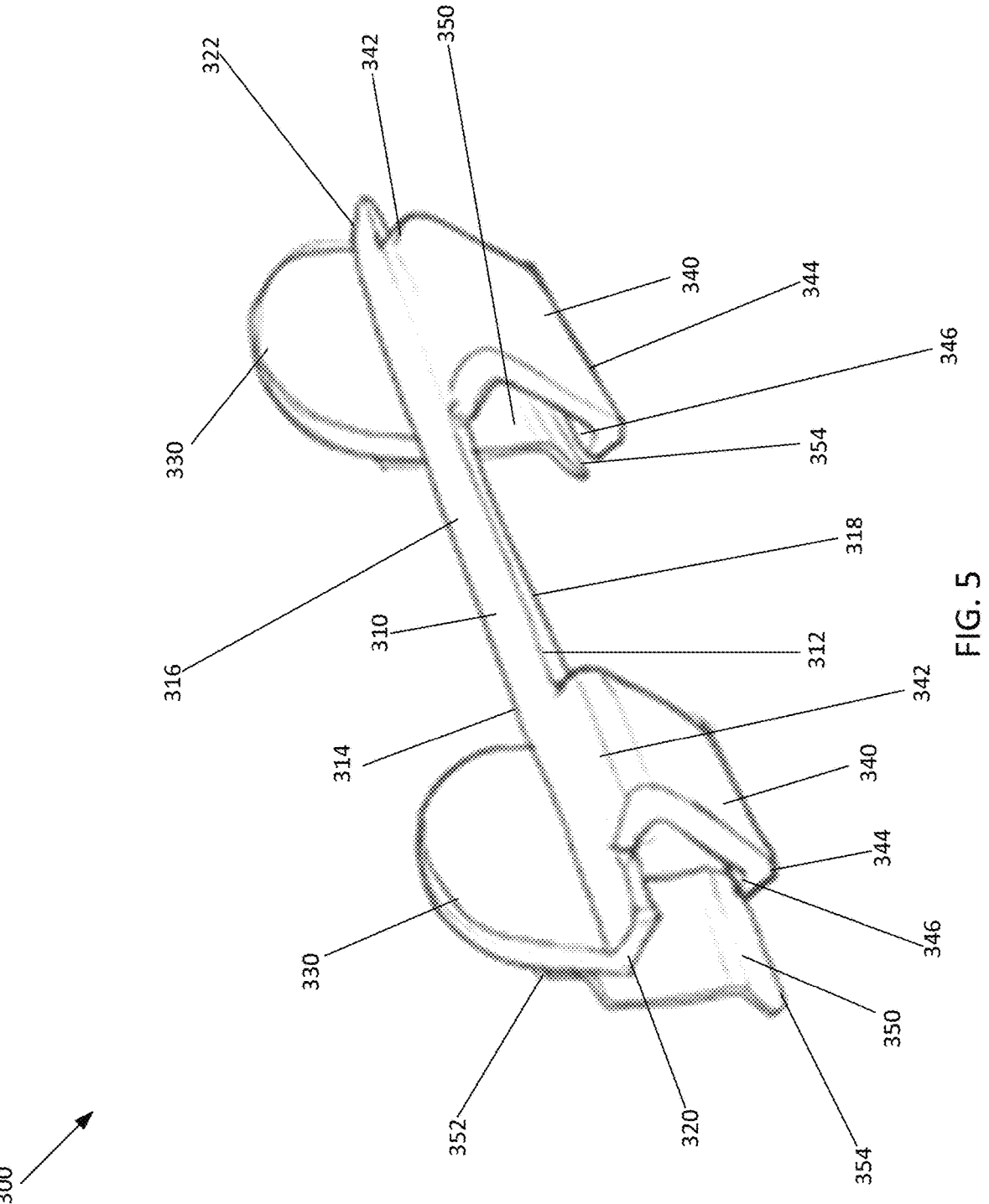
FIG. 5 illustrates a perspective view of a first embodiment of a removal tool for the sample well comb illustrated in FIGS. 4A and 4B and in accordance with the present disclosure, the removal tool being removably couplable to the sample well comb.
Figures 6A, 6B, 6C, 6D:
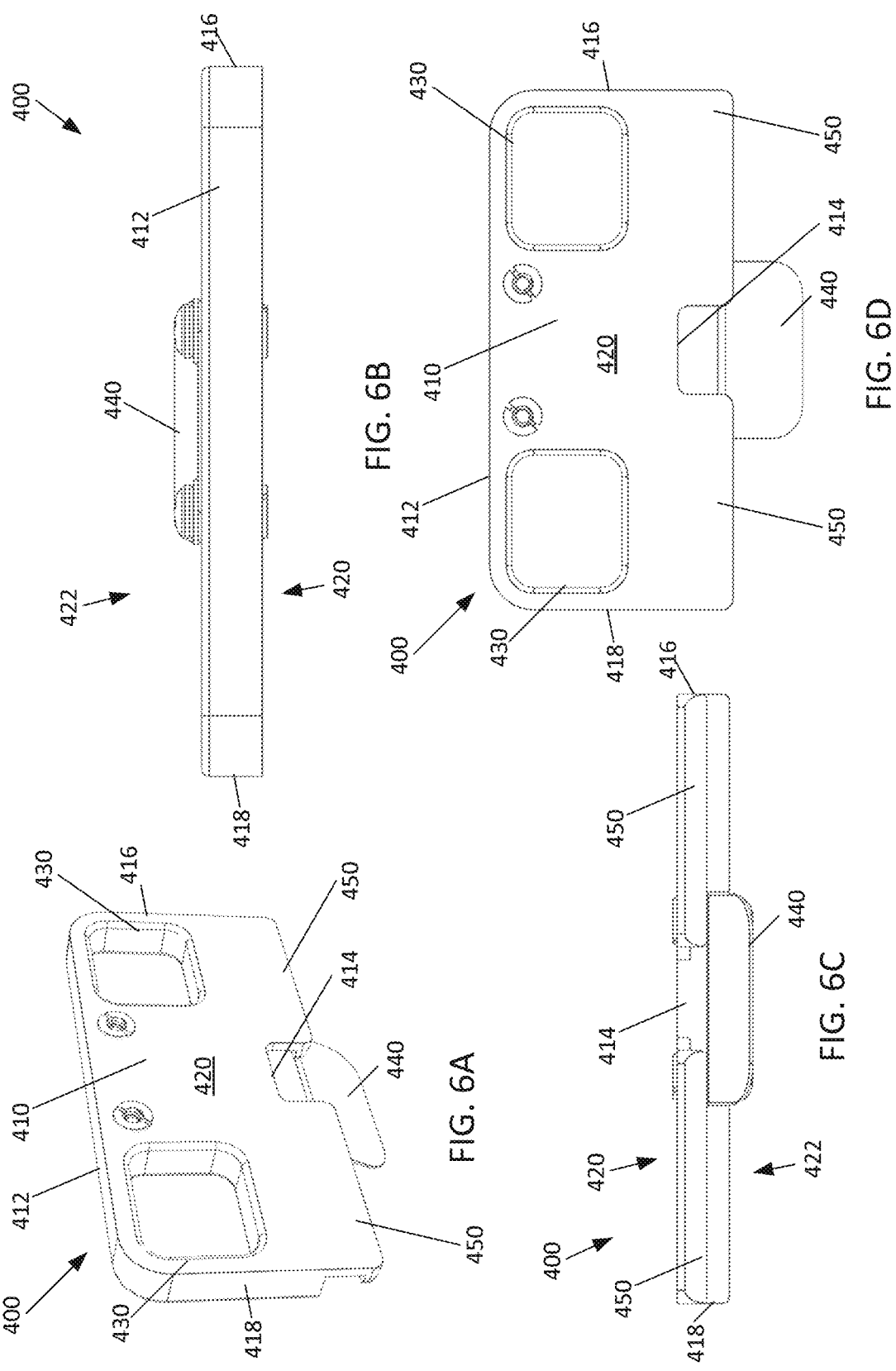
Figures 7E, 7F, 7G, 7H:
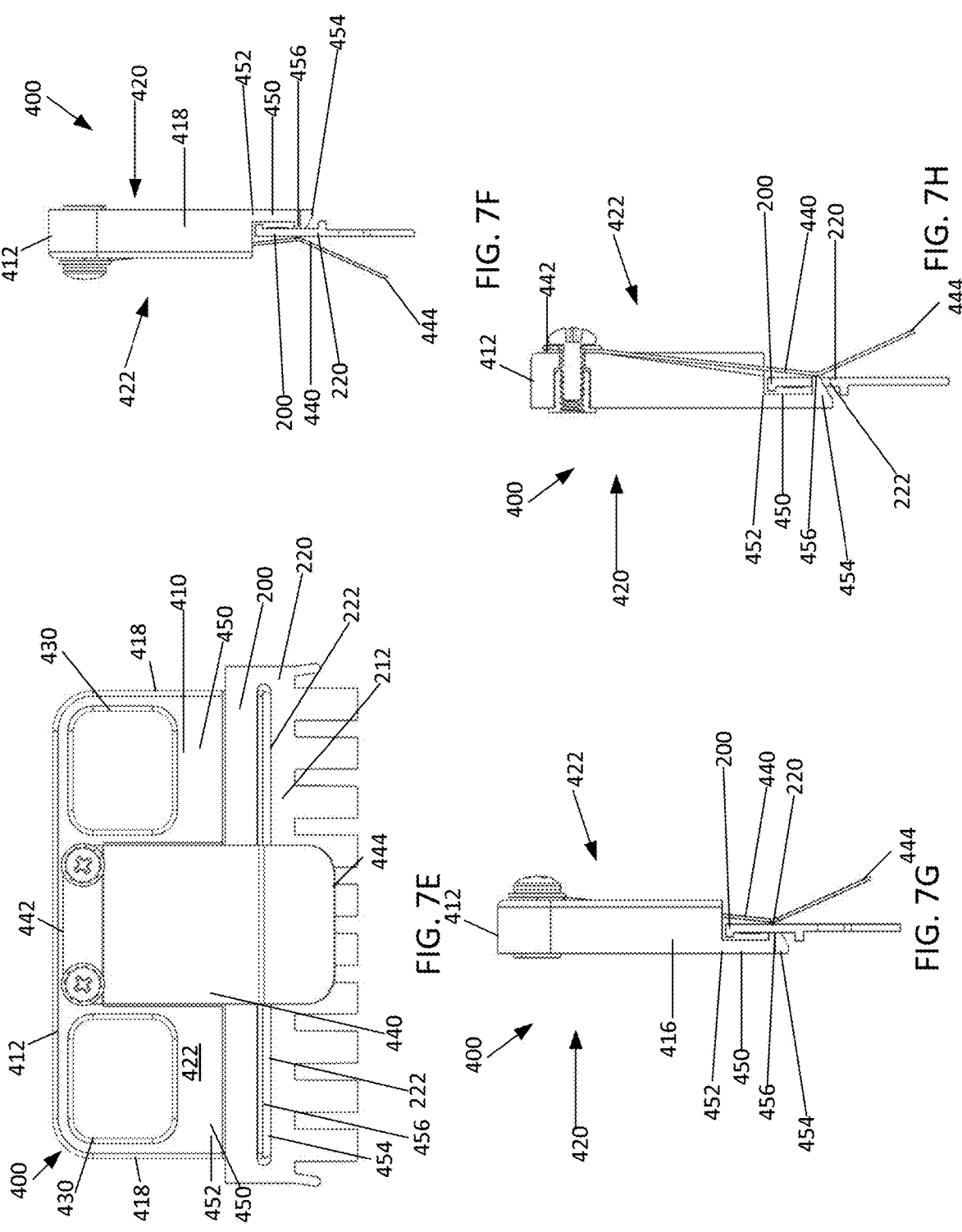

Turning to FIG. 5, illustrated is a perspective view of a first embodiment of a removal tool 300 for the sample well comb 200. The removal tool 300 may be removably coupled to the sample well comb 200 in order to aid in the removal of the sample well comb 200 from an electrophoresis gel. Essentially, the removal tool 300 provides an additional surface area (i.e., for additional leverage, etc.) for a user to grasp in order to more easily remove the sample well comb 200 from an electrophoresis gel. The removal tool 300 may include a base portion 310, handles 330, engagement members 340, and clamp members 350. The base portion 310 may be substantially planar and may include a first edge 312, an opposite second edge 314, a top surface 316 spanning between the first edge 312 and the second edge 314, and a bottom surface 318 opposite the top surface 316 and also spanning between the first edge 312 and the second edge 314. The base portion 310 may further include a first end 320 and an opposite second end 322. As illustrated in FIG. 5, the handles 330 extend upwardly from the second edge 314 of the base portion 310 beyond the top surface 316. One handle 330 may be coupled to the second edge 314 of the base portion 310 proximate to the first end 320, while the other handle 330 may be coupled to the second edge 314 of the base portion 310 proximate to the second end 322. The handles 330 illustrated in FIG. 5 may be in the shape of half circles but may be of any other shape in other embodiments of the removal tool 300.

Continuing with FIG. 5, the engagement members 340 may be coupled to, and extend downwardly from, the first edge 312 of the base portion 310 beyond the bottom surface 318. Each engagement member 340 may include a proximal end 342, which is coupled to the first edge 312 of the base portion 310, and an opposite distal end 344. Disposed on the distal end 344 may be a flange 346, which, as explained further below, is configured to engage/be disposed within the openings 222 of the upper portion 220 of the sample well comb 200. As further illustrated in FIG. 5, one engagement member 340 may be coupled to the first edge 312 of the base portion 310 proximate to the first end 320, while the other engagement member 340 may be coupled to the first edge 312 of the base portion 310 proximate to the second end 322.

As further illustrated in FIG. 5, the base portion 310, the handles 330, and the engagement members 340 may be formed as a single unitary structure. In some embodiments, this unitary structure may be formed from plastic, metal, or other suitable material. The clamp members 350, however, may be separate structures that are affixed to the unitary structure of the removal tool 300 via any know method, including, but not limited to, adhesives, bonding, fasteners, etc. More specifically, the clamp members 350 may each include a proximal end 352 and an opposite distal end 354. The proximal end 352 of each clamp member 350 may be coupled to a handle 330 such that each clamp member 350 descends downwardly from its respective handle 330 and beyond the bottom surface 318 of the base portion 310. Thus, as illustrated, each clamp member 350 is spaced from and at least partially opposes an engagement member 340. The clamp members 350 may be constructed from sheet metal or another material that is configured to at least partially bend/flex but return to a normal unflexed state.

While not illustrated, the removal tool 300 may be coupled to the upper portion 220 of the sample well comb 200. More specifically, the flange 346 of the distal end 344 of each engagement member 340 may be inserted into an opening 222 of the upper portion 220 of the sample well comb 200 such that the engagement members 340 are disposed on a first side 210 of the sample well comb 200. Meanwhile, the clamp members 350 may be disposed against one of the glass plates 106 disposed about the electrophoresis gel and against on the second side 212 of the sample well comb 200. The user may then grasp the removal tool 300 via the handles 330 and pull upwardly on the removal tool 300 to extract the sample well comb 200 from the electrophoresis gel. As the sample well comb 200 is pulled upwardly beyond the glass plate 106, such that the distal ends 354 of the clamp members 350 pass beyond the top edge of the glass plate 106 (and such that the openings 222 of the upper portion 220 of the sample well comb 200 pass beyond the top edge of the glass plate 106), the clamp members 350 may spring back toward the second side 212 of the sample well comb 200. In accordance with some embodiments, the clamp members 350 may apply a clamping force onto the upper portion 220 of the sample well comb 200 in order to clamp or capture the upper portion 220 of the sample well comb 200 between the clamp members 350 and the engagement members 340. In addition, the top end 202 of the sample well comb 200 may be disposed proximate to the bottom surface 318 of the base portion 310 of the removal tool 300. The clamping force applied by the clamp members 350 may prevent the sample well comb 200 from falling off of (i.e., being disconnected or uncoupled from) the removal tool 300 and falling into the gel tank 122.

Turning to FIGS. 6A-6G, illustrated is a perspective view of a second embodiment of a removal tool 400 for the sample well comb 200. Like the removal tool 300, the removal tool 400 may be removably coupled to the sample well comb 200 in order to aid in the removal of the sample well comb 200 from an electrophoresis gel. The removal tool 400 provides a surface/region for a user to grasp in order to more easily remove the sample well comb 200 from an electrophoresis gel. The removal tool 400 may include a main portion 410, a central clamp 440, and engagement members 450. The main portion 410 may be substantially planar and may include a top edge 412, an opposite bottom edge 414, a first end 416 spanning between the top edge 412 and the bottom edge 414, and a second end 418 opposite the first end 416 and also spanning between the top edge 412 and the bottom edge 414. The main portion 410 may further include a first side 420 and an opposite second side 422. As illustrated in FIGS. 6A-6G, openings 430 are disposed in the main portion 410 such that the openings 430 extend through the main portion 410 from the first side 420 to the second side 422. One opening 430 may be disposed in the main portion 410 proximate to the first end 416, while the other opening 430 may be disposed in the main portion 410 proximate to the second end 418. The openings 430 illustrated in FIGS. 6A-6G may be substantially square shaped, but other embodiments of the removal tool 400 may include openings 430 of any other shape (e.g., circular, half circular, oval, triangular, etc.). In addition, while the embodiment illustrated in FIG. 6 includes two openings, other embodiments of the removal tool 400 may include any number of openings 430 or even no openings 430.

As further illustrated in FIGS. 6A-6G, the central clamp 440 may be coupled to the second side 422 of the main portion 410 such that the central clamp 440 is disposed between the openings 430. The central clamp 440 may include a proximal end 442 and a distal end 444, where the proximal end may be coupled to the main portion 410 via any known coupling method (e.g., fasteners, adhesives, bonding, etc.). The central clamp 440 may be constructed from sheet metal, plastic, or any other material that has a degree of resiliency and that is configured to at least partially bend/flex and return to a normal unflexed state (e.g., spring back to the unflexed state). Thus, the central clamp 440 may be constructed from any material that is capable of applying a clamping force.

Continuing with FIGS. 6A-6G, the engagement members 450 may be coupled to, and extend downwardly from, the bottom edge 414 of the main portion 410. Each engagement member 450 may include a proximal end 452, which is coupled to the bottom edge 414 of the main portion 410, and an opposite distal end 454. Disposed on the distal end 454 may be a flange 456, which, as explained further below, is configured to engage/be disposed within the openings 222 of the upper portion 220 of the sample well comb 200. As further illustrated in FIGS. 6A-6G, one engagement member 450 may be coupled to the bottom edge 414 of the main portion 410 proximate to the first end 416, while the other engagement member 450 may be coupled to the bottom edge 414 of the main portion 410 proximate to the second end 418.

As illustrated in FIGS. 7A-7H, the removal tool 400 may be coupled to the upper portion 220 of the sample well comb 200. More specifically, the flange 456 of the distal end 454 of each engagement member 450 may be inserted into an opening 222 of the upper portion 220 of the sample well comb 200 such that the engagement members 450 are disposed on a first side 210 of the sample well comb 200. Meanwhile, the central clamp 440 may be disposed against one of the glass plates 106 disposed about the electrophoresis gel and disposed against the second side 212 of the sample well comb 200. The user may then grasp the removal tool 400 via the openings 430 and pull upwardly on the removal tool 400 to extract the sample well comb 200 from the electrophoresis gel. As the sample well comb 200 is pulled upwardly beyond the glass plate 106, such that the distal end 444 of the central clamp 440 passes beyond the top edge of the glass plate 106 (and such that the openings 222 of the upper portion 220 of the sample well comb 200 pass beyond the top edge of the glass plate 106), the central clamp 440 may spring back toward the second side 212 of the sample well comb 200. In accordance with some embodiments, the central clamp 440 may apply a clamping force onto the upper portion 220 of the sample well comb 200 in order to clamp the upper portion 220 of the sample well comb 200 between the central clamp 440 and the engagement members 450. The clamping force applied by the central clamp 440 may prevent the sample well comb 200 from falling off of (i.e., being disconnected or uncoupled from) the removal tool 400, and falling into the gel tank 122. In addition, the top end 202 of the sample well comb 200 may be disposed proximate to the bottom edge 414 of the main portion 410 of the removal tool 400.

Figures 8A, 8B:
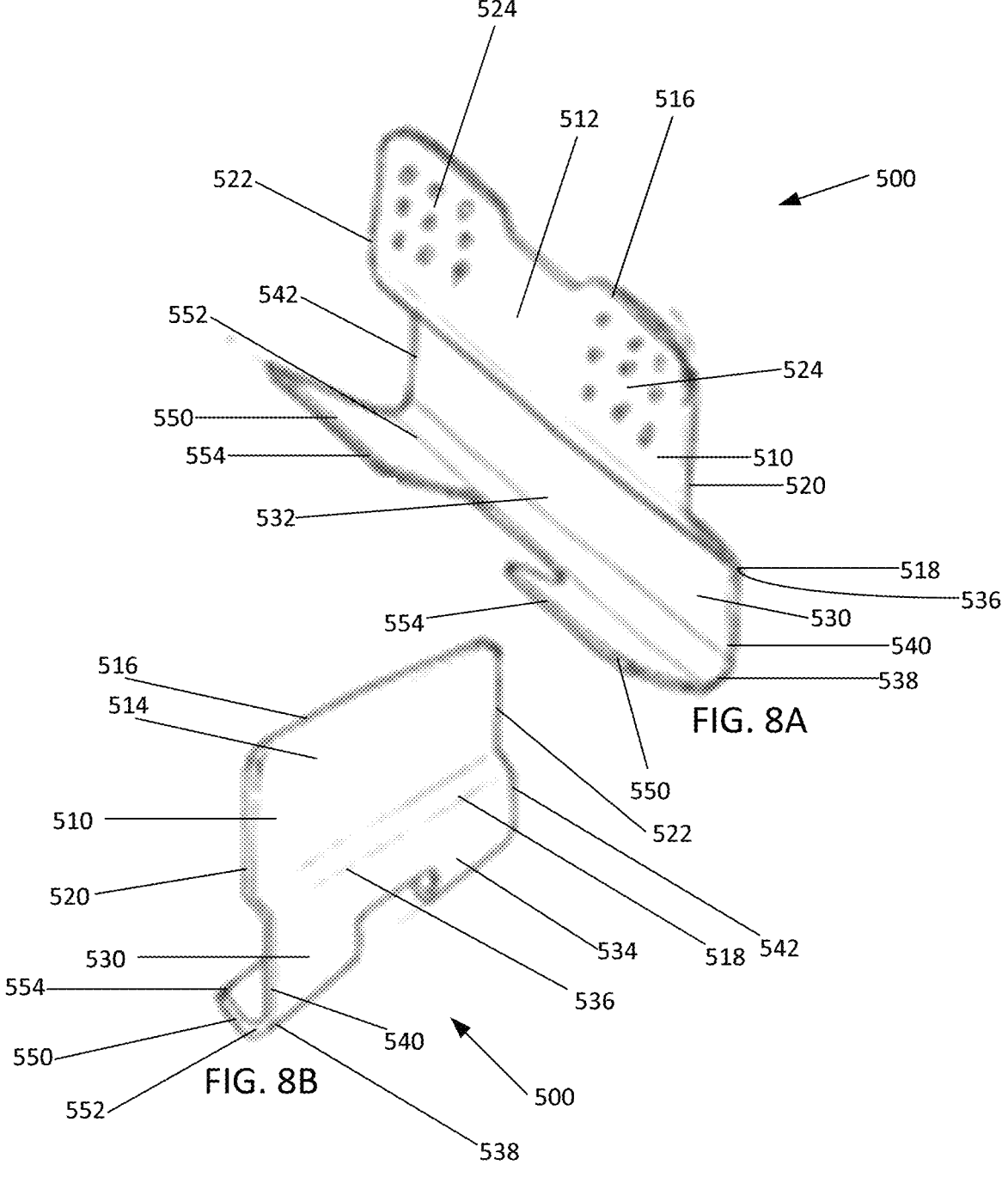
FIGS. 8A and 8B illustrate perspective views of a third embodiment of a removal tool for the sample well comb illustrated in FIGS. 4A and 4B in accordance with the present disclosure, the removal tool being removably couplable to the sample well comb.
Figures 9A, 9B, 9C, 9D:
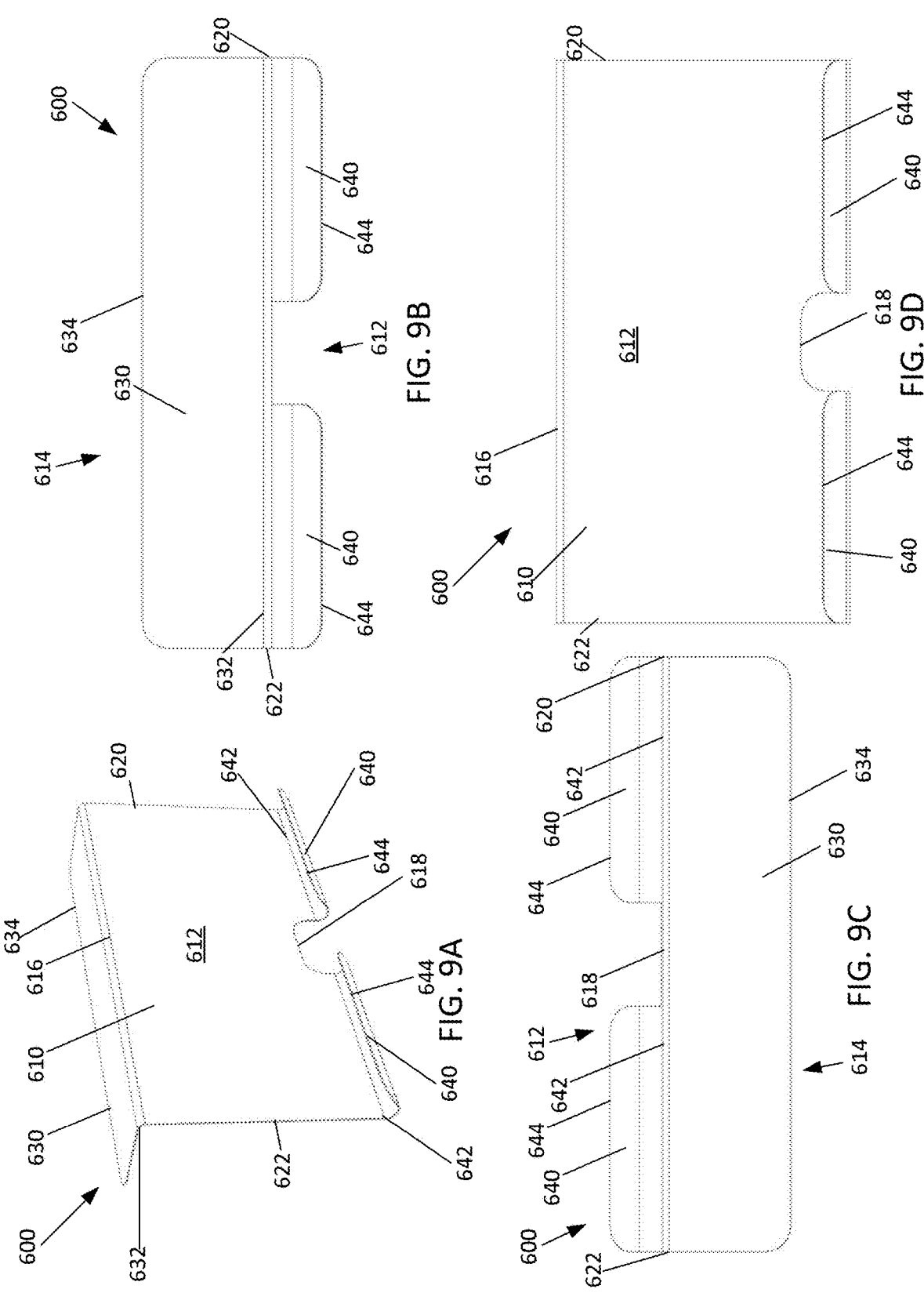
FIGS. 9A-9G illustrate various views (perspective, top, bottom, front, rear, left, and right) of a fourth embodiment of a removal tool for the sample well comb illustrated in FIGS. 4A and 4B and in accordance with the present disclosure, the removal tool being removably couplable to the sample well comb.
Figures 9E, 9F, 9G:
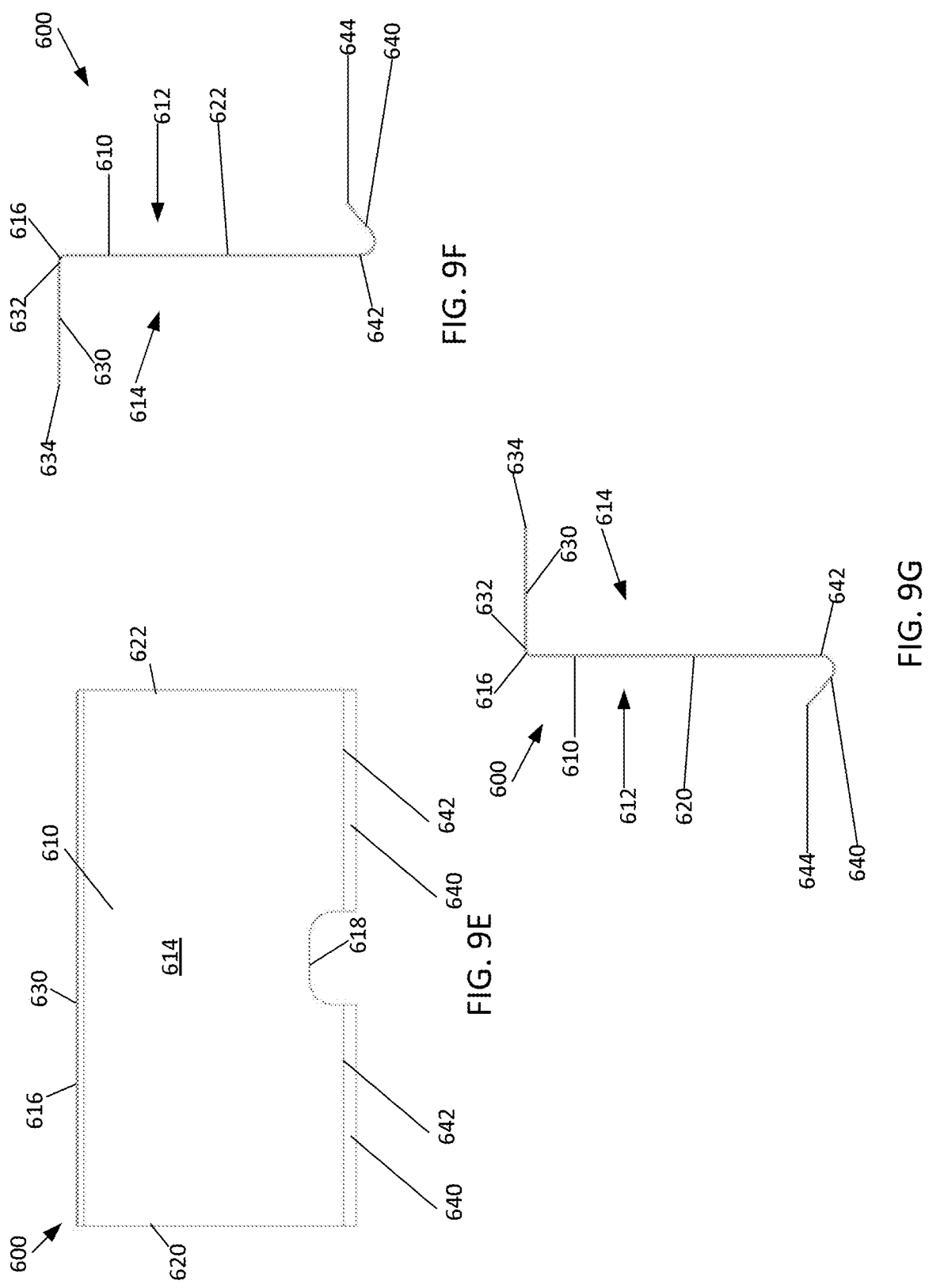
Figures 10A, 10B, 10C, 10D:
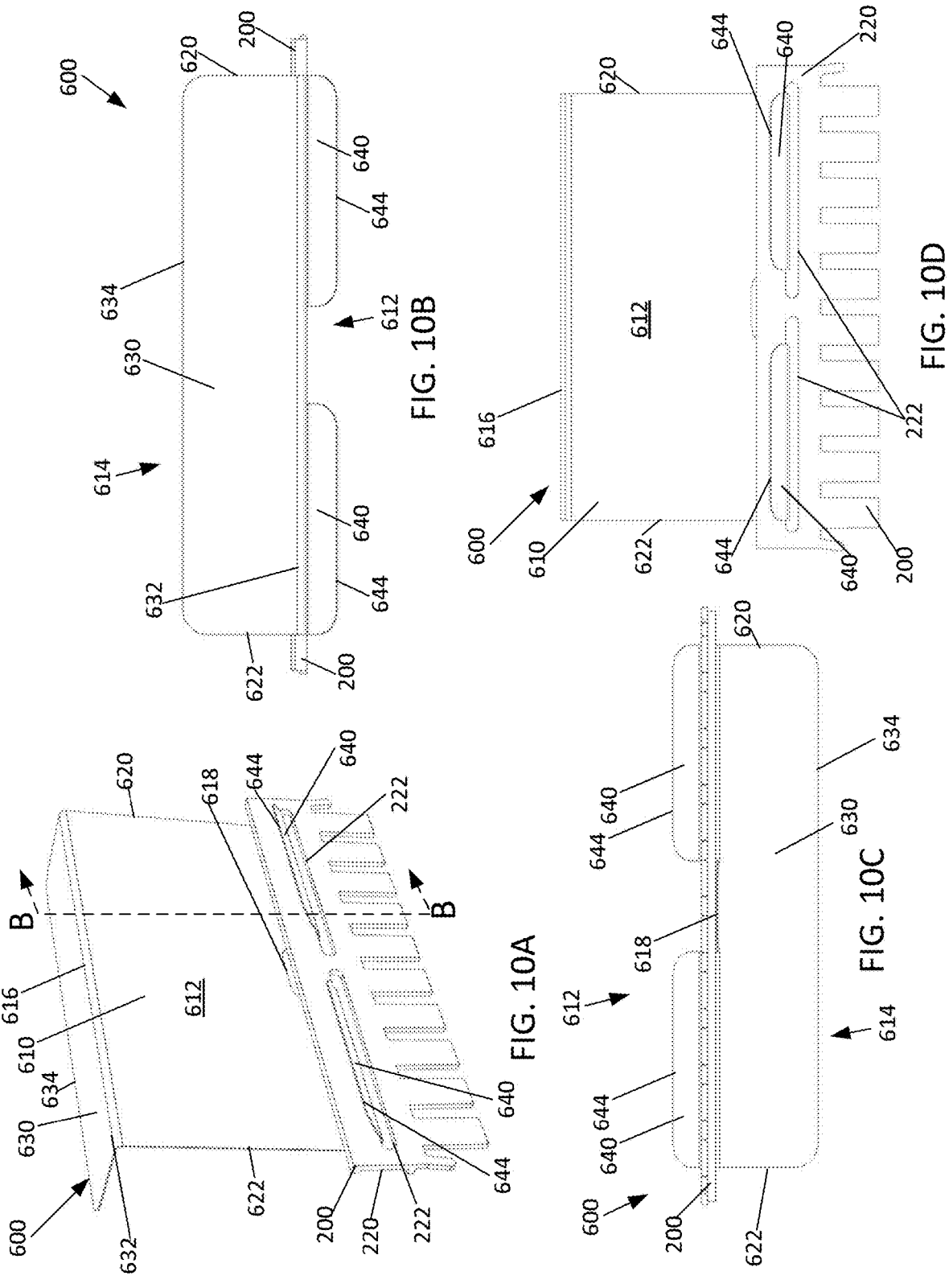

Turning to FIGS. 8A and 8B, illustrated are perspective views of a third embodiment of a removal tool 500 for the sample well comb 200. Like the removal tools 300 and 400, the removal tool 500 may be removably coupled to the sample well comb 200 in order to aid in the removal of the sample well comb 200 from an electrophoresis gel. The removal tool 500 provides a surface/region for a user to grasp in order to more easily remove the sample well comb 200 from an electrophoresis gel. The removal tool 500 may include an upper portion 510, a lower portion 530, and engagement members 550. The upper portion 510 may be substantially planar and may include a first side 512 and an opposite second side 514. The upper portion 510 may further include a top edge 516, an opposite bottom edge 518, a first end 520 spanning between the top edge 516 and the bottom edge 518, and a second end 522 opposite the first end 520 and also spanning between the top edge 516 and the bottom edge 518. The upper portion 510 may further include two handle portions 524 extending upwardly from the top edge 516 of the upper portion 510. The handle portions 524 may be equipped with gripping elements that facilitate a user to more easily grip or grasp the handle portion 524.

Continuing with FIGS. 8A and 8B, the lower portion 530 may also be substantially planar and may include a first side 532 and an opposite second side 534. The lower portion 530 may further include a top edge 536, an opposite bottom edge 538, a first end 540 spanning between the top edge 536 and the bottom edge 538, and a second end 542 opposite the first end 540 and also spanning between the top edge 536 and the bottom edge 538. As illustrated, the top edge 536 of the lower portion 530 may be coupled to the bottom edge 518 of the upper portion 510. Furthermore, the lower portion 530 may be vertically offset from the upper portion 510. In other words, the upper portion 510 may be oriented in a different vertical plane than the lower portion 530. A pair of engagement member 550 may be coupled to the bottom edge 538 of the lower portion 530 such that the engagement members 550 extend upward at an angle from the bottom edge 538 of the lower portion 530, and such that the engagement members 550 are disposed in proximity to the second side 534 of the of the lower portion 530. Each engagement member 550 may include a proximal end 552, which is coupled to the bottom edge 538 of the lower portion 530, and a distal end 554. Thus, because the engagement members 550 extend from the bottom edge 538 of the lower portion 530 at an upward angle that is offset from vertical, the distal end 554 of each engagement member 550 is disposed above the proximal end 552 of each engagement member 550. As best illustrated in FIG. 8A, one engagement member 550 is disposed more proximate to the first end 540 of the lower portion 530, while the other engagement member 550 is disposed more proximate to the second end 542 of the lower portion 530.

While not illustrated, the removal tool 500 may be configured to aid in the removal of a sample well comb 200 in order to facilitate the removal of the sample well comb 200 from an electrophoresis gel. More specifically, the distal ends 554 of the engagement members 550 may be inserted into the openings 222 of the upper portion 220 of the sample well comb 200 such that the lower portion 530 is disposed on a first side 210 of the sample well comb 200. With the engagement members 550 disposed in the openings 222 of the sample well comb 200, the user may grip the handle portions 524 and pull upward on the removal tool 500 to extract the sample well comb 200 from the electrophoresis gel. Because of the upwardly angled orientation of the engagement members 550, as the sample well comb 200 is pulled beyond the glass plates 106 disposed about the electrophoresis gel, the sample well comb 200 may slide downwardly along the engagement members 550 toward the proximal ends 552 of the engagement members 550 and toward the second side 534 of the lower portion 530. This further secures the sample well comb 200 on the removal tool 500 once the sample well comb 200 is completely removed from the electrophoresis gel.

Turning to FIGS. 9A-9G, illustrated are perspective views of a fourth embodiment of a removal tool 600 for the sample well comb 200. Like the removal tools 300, 400, and 500, the removal tool 600 may be removably coupled to the sample well comb 200 in order to aid in the removal of the sample well comb 200 from an electrophoresis gel. The removal tool 600 provides a surface/region for a user to grasp in order to more easily remove the sample well comb 200 from an electrophoresis gel. The removal tool 600 may include a main body 610, an upper portion 630, and engagement members 640. The main body 610 may be substantially planar and may include a first side 612 and an opposite second side 614. The main body 610 may further include a top edge 616, an opposite bottom edge 618, a first end 620 spanning between the top edge 616 and the bottom edge 618, and a second end 622 opposite the first end 620 and also spanning between the top edge 616 and the bottom edge 618.

Continuing with FIGS. 9A-9G, an upper portion 630 may extend outwardly from the top edge 616 of the main body 610 such that the upper portion 630 extends from the first side 612 of the main body 610. The upper portion 630 includes a proximal end 632, which is coupled to the top edge 616 of the main body 610, and a distal end 634. In some embodiments, the upper portion 630 may be oriented substantially perpendicular to the main body 610. In other embodiments, the upper portion 630 may be oriented at an acute angle with respect to the main body 610, while in some further embodiments, the upper portion 630 may be oriented at an obtuse angle with respect to the main body 610.

With continued reference to FIGS. 9A-9G, a pair of engagement member 640 may be coupled to the bottom edge 618 of the main body 610 such that the engagement members 640 extend upward at an acute angle from the bottom edge 618 of the main body 610. Moreover, the engagement members 640 extend from the second side 614 of the main body 610. Thus, the engagement members 640 extend from the main body 610 in a substantially opposite direction from that of the upper portion 630. Each engagement member 640 may include a proximal end 642, which is coupled to the bottom edge 618 of the upper portion 630, and a distal end 644. Thus, because the engagement members 640 extend from the bottom edge 618 of the main body 610 at an upward acute angle with respect to the main body 610 (i.e., at an upward angle that is offset from the vertical plane in which the main body 610 is disposed), the distal end 644 of each engagement member 640 is disposed above the proximal end 642 of each engagement member 640. As further illustrated, one engagement member 640 is disposed more proximate to the first end 620 of the main body 610, while the other engagement member 640 is disposed more proximate to the second end 622 of the main body 610.

As best illustrated in FIGS. 10A-10H, the removal tool 600 may be configured to aid in the removal of a sample well comb 200 in order to facilitate the removal of the sample well comb 200 from an electrophoresis gel. More specifically, the distal ends 644 of the engagement members 640 may be inserted into the openings 222 of the upper portion 220 of the sample well comb 200 such that the main body 610 is disposed on or proximate to the first side 210 of the sample well comb 200. With the engagement members 640 disposed in the openings 222 of the sample well comb 200, the user may grip the upper portion 630 and pull upward on the removal tool 600 to extract the sample well comb 200 from the electrophoresis gel. Because of the upwardly angled orientation of the engagement members 640, as the sample well comb 200 is pulled beyond the glass plates 106 disposed about the electrophoresis gel, the sample well comb 200 may slide downwardly along the engagement members 640 toward the proximal ends 642 of the engagement members 640 and toward the second side 614 of the main body 610. This further secures the sample well comb 200 on the removal tool 600 once the sample well comb 200 is completely removed from the electrophoresis gel.

Figure 11:
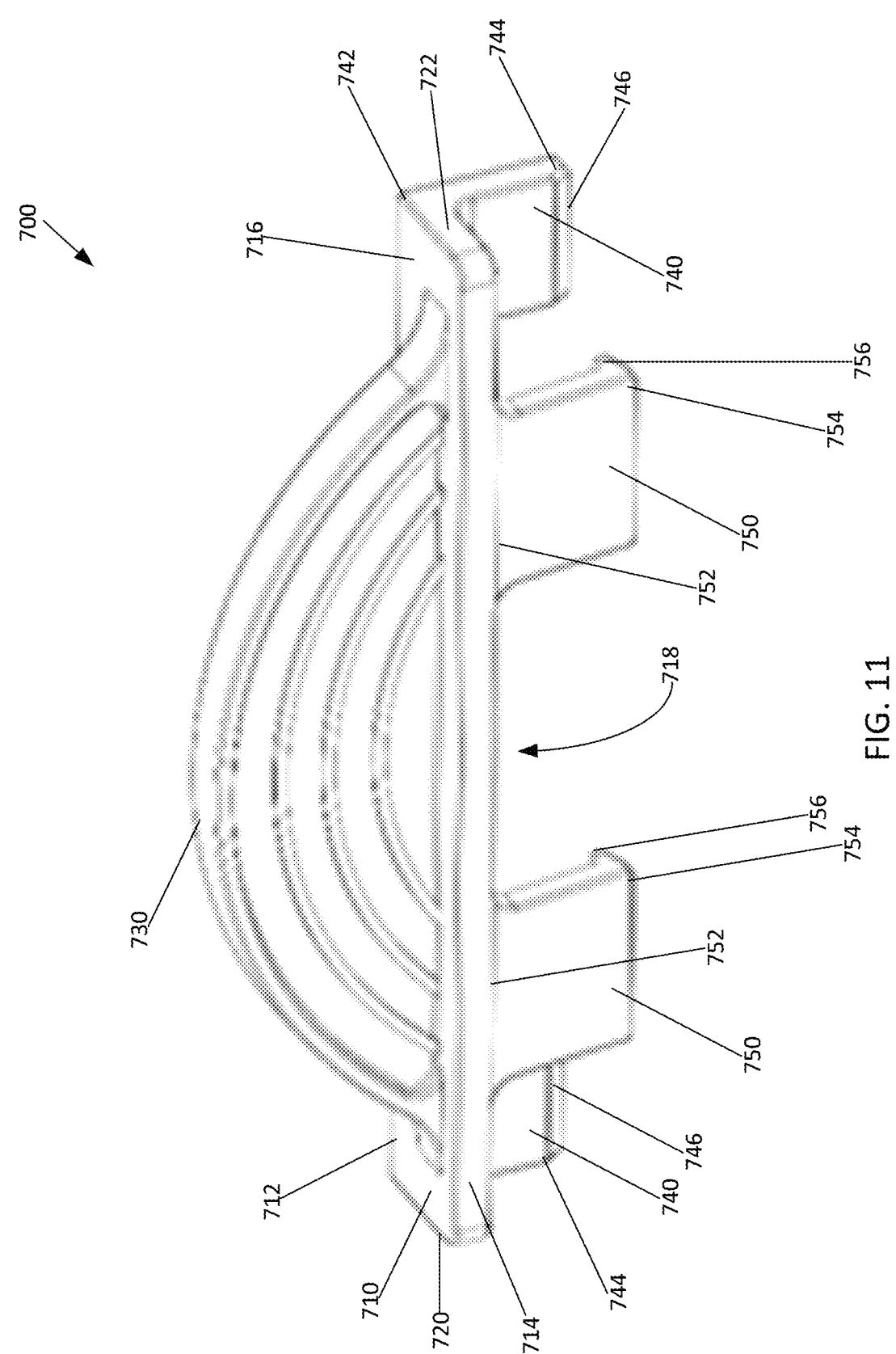
FIG. 11 illustrates a perspective view of a fifth embodiment of a removal tool for the sample well comb illustrated in FIGS. 4A and 4B and in accordance with the present disclosure, the removal tool being removably couplable to the sample well comb.

Turning to FIG. 11, illustrated is a perspective view of a fifth embodiment of a removal tool 700 for the sample well comb 200. The removal tool 700 may be removably coupled to the sample well comb 200 in order to aid in the removal of the sample well comb 200 from an electrophoresis gel. Essentially, the removal tool 700 provides an additional surface area (i.e., for additional leverage, etc.) for a user to grasp in order to more easily remove the sample well comb 200 from an electrophoresis gel. The removal tool 700 may include a base portion 710, a handle 730, first side engagement members 740, and second side engagement members 750. The base portion 710 may be substantially planar and may include a first edge 712, an opposite second edge 714, a top surface 716 spanning between the first edge 712 and the second edge 714, and a bottom surface 718 opposite the top surface 716 and also spanning between the first edge 712 and the second edge 714. The base portion 710 may further include a first end 720 and an opposite second end 722. As illustrated in FIG. 11, the handle 730 may be centrally disposed on the top surface 716 of the base portion 710 such that the handle 730 is equidistant from the first and second edges 712, 714, and equidistant from the first and second ends 720, 722. The handle 730 may extend upwardly from the top surface 716 of the base portion 710. The handle 730 illustrated in FIG. 11 may be in the shape of a half circle or semi-circle, and may contain a plurality of ridges 732 that are configured to provide grip for a user grasping/gripping the handle 730. However, other embodiments of the removal tool 700 may have any number of handles 730 that are of any other shape.

Continuing with FIG. 11, the first side engagement members 740 may be coupled to, and extend downwardly from, the first edge 712 of the base portion 710 beyond the bottom surface 718 of the base portion 710. Each of the first side engagement member 740 may include a proximal end 742, which is coupled to the first edge 712 of the base portion 710, and an opposite distal end 744. Disposed on the distal end 744 may be a flange 746, which, as explained further below, is configured to engage/be disposed within the openings 222 of the upper portion 220 of the sample well comb 200. As further illustrated in FIG. 11, one first side engagement member 740 may be coupled to the first edge 712 of the base portion 710 proximate to the first end 720, while the other first side engagement member 740 may be coupled to the first edge 712 of the base portion 710 proximate to the second end 722.

As further illustrated in FIG. 11, the second side engagement members 750 may be coupled to, and extend downwardly from, the second edge 714 of the base portion 710 beyond the bottom surface 718 of the base portion 710. Each of the second side engagement member 750 may include a proximal end 752, which is coupled to the second edge 714 of the base portion 710, and an opposite distal end 754. Disposed on the distal end 754 may be a flange 756, which, like that of the flanges 746 of the first side engagement members 740, is configured to engage/be disposed within the openings 222 of the upper portion 220 of the sample well comb 200. As further illustrated in FIG. 11, second side engagement member 750 may be coupled to the second edge 714 of the base portion 710 more proximate to the first end 720 than the second end 722, while the other second side engagement member 750 may be coupled to the second edge 714 of the base portion 710 more proximate to the second end 722 than the first end 720. As further illustrated, the first side engagement members 740 and the second side engagement members 750 may not directly oppose one another. In other words, the second side engagement members 750 may be inset along the second edge 714 of the base portion 710 from the positioning of the first side engagement members 740 along the first edge 712 of the base portion 710. As illustrated, the first side engagement members 740 may be disposed on the first edge 712 of the base portion 710 such that the first side engagement members 740 are disposed at, or adjacent to, the first and second ends 720, 722. Conversely, the second side engagement members 750 may be disposed on the second edge 714 of the base portion 710 such that the second side engagement members 750 are spaced from the first and second ends 720, 722. The first and second side engagement members 740, 750 may be formed such that they have a degree of flex or resiliency, and such that the engagement members 740, 750 are capable of returning to their unflexed state after being flexed.

While not illustrated, the removal tool 700 may be coupled to the upper portion 220 of the sample well comb 200. More specifically, the flange 746 of the distal end 744 of each first side engagement member 740 may be inserted into an opening 222 of the upper portion 220 of the sample well comb 200 from the first side 210 of the sample well comb 200. Meanwhile, while the sample well comb 200 is still disposed within the electrophoresis gel, the second side engagement members 750 may be disposed against the glass plate 106 disposed against the second side 212 of the sample well comb 200. The user may then grasp the removal tool 700 via the handle 730 and pull upwardly on the removal tool 700 to extract the sample well comb 200 from the electrophoresis gel. As the sample well comb 200 is pulled upwardly beyond the glass plate 106, such that the distal ends 754 of the second side engagement members 750 pass beyond the top edge of the glass plate 106 (and such that the openings 222 of the upper portion 220 of the sample well comb 200 pass beyond the top edge of the glass plate 106), the second side engagement members 750 may spring back toward the second side 212 of the sample well comb 200. Furthermore, the flanges 756 of the distal ends 754 of the second side engagement members 750 may spring into the openings 222 of the upper portion 220 of the sample well comb 200. In addition, the top end 202 of the sample well comb 200 may be disposed proximate to the bottom surface 718 of the base portion 710 of the removal tool 700. Because the flanges 746, 756 of the first side engagement members 740 and the second side engagement members 750, respectively, are disposed in the openings 222 of the upper portion 220 of the sample well comb 200, the sample well comb 200 is prevented from falling off of (i.e., being disconnected or uncoupled from) the removal tool 700 and falling into the gel tank 122.

Figure 12:
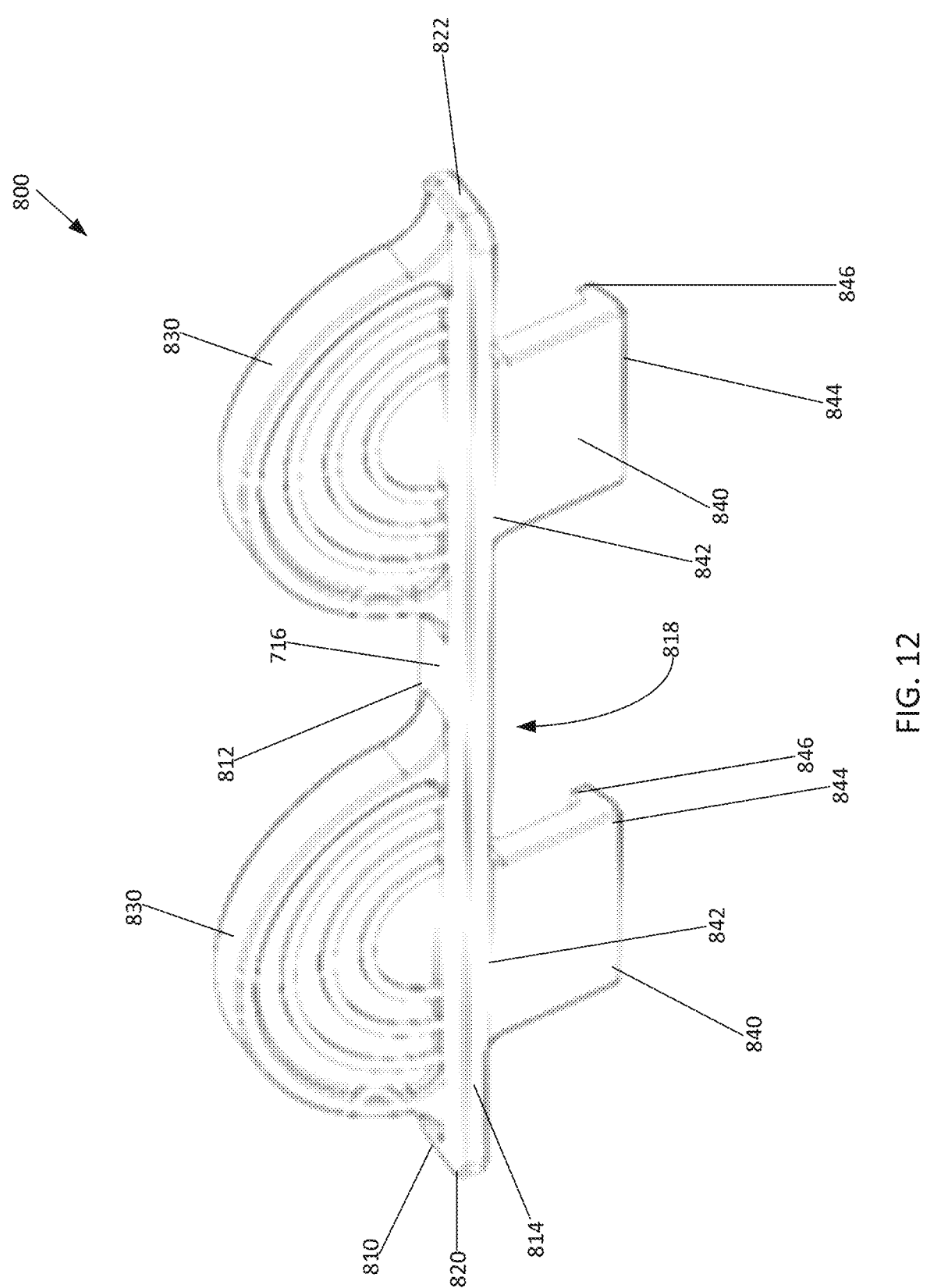
FIG. 12 illustrates a perspective view of a sixth embodiment of a removal tool for the sample well comb illustrated in FIGS. 4A and 4B and in accordance with the present disclosure, the removal tool being removably couplable to the sample well comb.

Turning to FIG. 12, illustrated is a perspective view of a sixth embodiment of a removal tool 800 for the sample well comb 200. Like the removal tools 300, 400, 500, 600, and 700, the removal tool 800 may be removably coupled to the sample well comb 200 in order to aid in the removal of the sample well comb 200 from an electrophoresis gel. Essentially, the removal tool 800 provides an additional surface area (i.e., for additional leverage, etc.) for a user to grasp in order to more easily remove the sample well comb 200 from an electrophoresis gel. The removal tool 800 may include a base portion 810, a plurality of handles 830, and engagement members 840. The base portion 810 may be substantially planar and may include a first edge 812, an opposite second edge 814, a top surface 816 spanning between the first edge 812 and the second edge 814, and a bottom surface 818 opposite the top surface 816 and also spanning between the first edge 812 and the second edge 814. The base portion 810 may further include a first end 820 and an opposite second end 822. As illustrated in FIG. 12, the removal tool 800 includes two handles 830 that are disposed on the top surface 816 of the base portion 810 such that the handles 830 are equidistant from the first and second edges 812, 814. A first handle 830 may be disposed more proximate to the first end 820 than the second end 822, while a second handle 830 may be disposed more proximate to the second end 820 than the first end 824. Both handles 830 may extend upwardly from the top surface 816 of the base portion 810, and may be in the shape of a half circle or semi-circle. In addition, each handle 830 may contain a plurality of ridges 832 that are configured to provide grip for a user grasping/gripping the handles 830. However, other embodiments of the removal tool 800 may have handles 830 that are of any other shape.

Continuing with FIG. 12, the engagement members 840 may be coupled to, and extend downwardly from, the second edge 814 of the base portion 810 beyond the bottom surface 818 of the base portion 810. Each of the engagement members 840 may include a proximal end 842, which is coupled to the second edge 814 of the base portion 810, and an opposite distal end 844. Disposed on the distal end 844 may be a flange 846, which, as explained further below, is configured to engage/be disposed within the openings 222 of the upper portion 220 of the sample well comb 200. As further illustrated in FIG. 12, one engagement member 840 may be coupled to the second edge 814 of the base portion 810 more proximate to the first end 820 than the second end 822, but spaced from the first end 820. In addition, the other first side engagement member 840 may be coupled to the second edge 814 of the base portion 810 more proximate to the second end 822 than the first end 820, but spaced from the second end 822.

While not illustrated, the removal tool 800 may be coupled to the upper portion 220 of the sample well comb 200. More specifically, the flange 846 of the distal end 844 of each engagement member 840 may be inserted into an opening 222 of the upper portion 220 of the sample well comb 200 from the first side 210 of the sample well comb 200. The user may then grasp the removal tool 800 via the handles 830 and pull upwardly on the removal tool 800 to extract the sample well comb 200 from the electrophoresis gel. In addition, the top end 202 of the sample well comb 200 may be disposed proximate to the bottom surface 818 of the base portion 810 of the removal tool 800.

Figure 13:
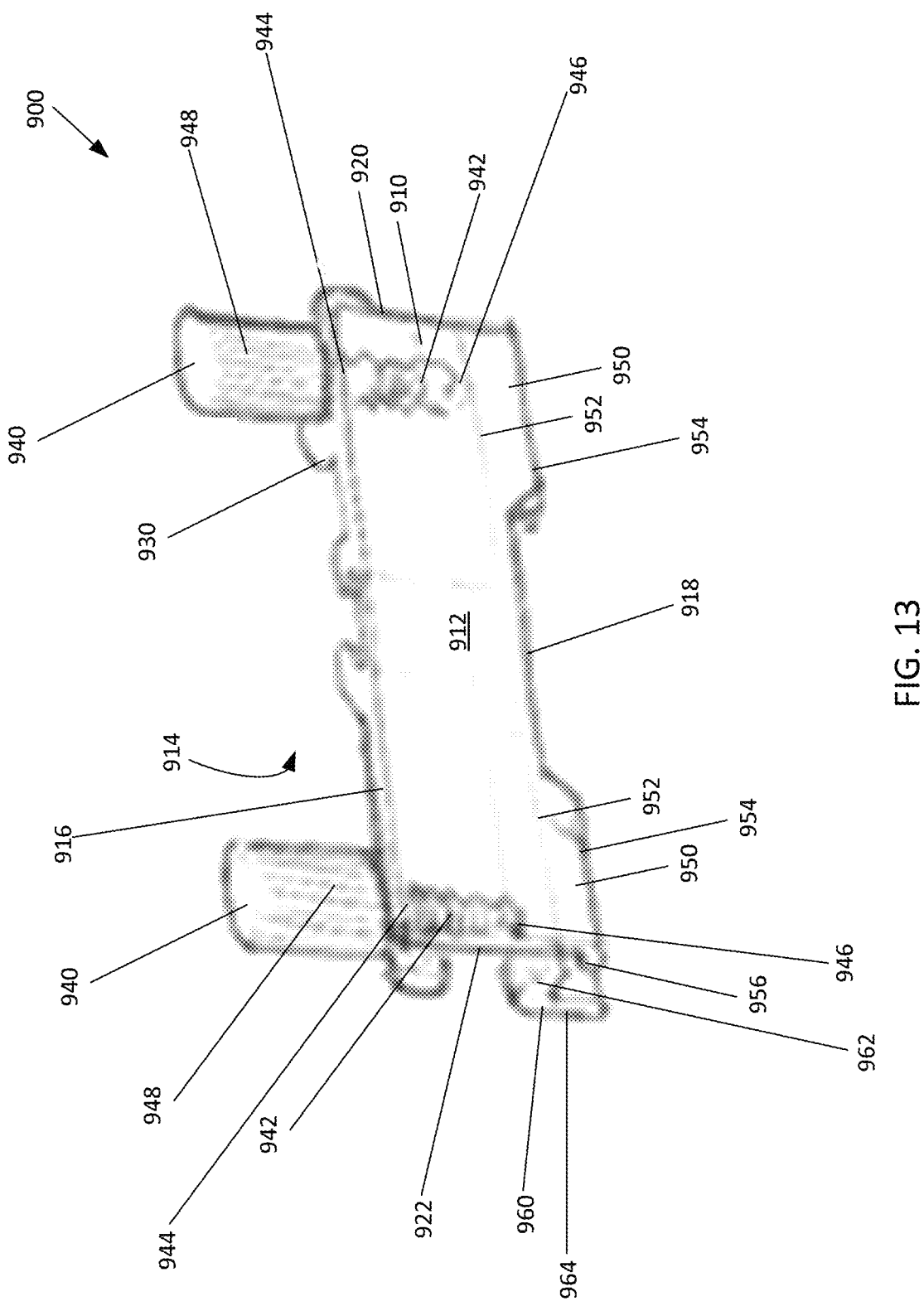
FIG. 13 illustrates a perspective view of a first embodiment of a mechanized removal tool for the sample well comb illustrated in FIGS. 4A and 4B and in accordance with the present disclosure, the illustrated mechanized removal tool is both removably couplable to the sample well comb and includes a mechanism for extracting the sample well comb from the electrophoresis gel.

Turning to FIG. 13, illustrated is a perspective view of a first mechanized embodiment of a removal tool 900 for the sample well comb 200. Like the previous embodiments of the removal tools 300, 400, 500, 600, 700, and 800, as disclosed above, the mechanized removal tool 900 may be removably coupled to the sample well comb 200 in order to aid in the removal of the sample well comb 200 from an electrophoresis gel. However, unlike the previous embodiments of the removal tools 300, 400, 500, 600, 700, and 800, the mechanized removal tool 900 may include a mechanism for extracting the sample well comb 200 from the electrophoresis gel. As illustrated, the removal tool 900 may include a main body 910, an upper platform 930, one or more screw members 940, engagement members 950, and clamp members 960. The main body 910 may be substantially planar, may be oriented substantially vertically, and may include first side 912 and an opposite second side 914. The main body 910 may further include a top edge 916, an opposite bottom edge 918, a first end 920 spanning between the top edge 916 and the bottom edge 918, and a second end 922 opposite the first end 920 and also spanning between the top edge 916 and the bottom edge 918.

As illustrated in FIG. 13, the upper platform 930 of the mechanized removal tool 900 may be coupled to the top edge 916 of the main body 910 such that the upper platform 930 extends from the second side 914 of the main body 910. Operatively coupled to the upper platform 930 is at least one screw member 940. While the illustrated embodiment includes two screw members 940 operatively coupled to the upper platform 930, the mechanized removal tool 900 may include any number of screw members 940. In the illustrated embodiment, one screw member 940 is operatively coupled to the upper platform 930 proximate to the first end 920, while the other screw member 940 is operatively coupled to the upper platform 930 proximate to the second end 922. Each screw member 940 may include at least a threaded portion 942 and a knob 948. The knob 948 may be disposed above the upper platform 930, while the threaded portion 942 may be threaded through the upper platform 930. The threaded portion 942 may include an upper end 944 and an opposite lower end 946. The knob 948 may be coupled to the upper end 944, while the lower end 946 of the threaded portion 942 may be configured to contact, abut, and/or engage a top edge of a glass plate 106 disposed about the electrophoresis gel.

Continuing with FIG. 13, the engagement members 950 may be coupled to, and extend downwardly from, the bottom edge 918 of the main body 910. Each of the engagement members 950 may include a proximal end 952, which is coupled to the bottom edge 918 of the main body 910, and an opposite distal end 954. Disposed on the distal end 954 may be a flange 956, which, as explained further below, is configured to engage/be disposed within the openings 222 of the upper portion 220 of the sample well comb 200. As further illustrated in FIG. 13, one engagement member 950 may be coupled to the bottom edge 918 of the main body 910 proximate to the first end 920, while the other engagement member 950 may be coupled to the bottom edge 918 of the main body 910 proximate to the second end 922.

As further illustrated in FIG. 13, the main body 910, the upper platform 930, and the engagement members 950 may be formed as a single unitary structure. In some embodiments, this unitary structure may be formed from plastic, metal, or any other suitable material. The clamp members 960, however, may be separate structures that are affixed to the unitary structure of the mechanized removal tool 900. More specifically, the clamp members 960 may each include an upper portion 962 and a lower portion 964, where the upper portion 962 and the lower portion 964 may be oriented substantially perpendicular to one another. The upper portion 962 of the clamp members 960 may be coupled to the second side 914 of the main body 910 proximate to the bottom edge 918 of the main body 910. The lower portion 964 may be spaced from the second side 914 of the main body 910, as well as the flange 956 of the engagement members 950. As illustrated, each clamp member 960 may be spaced from, and at least partially opposed from, an engagement member 950. The clamp members 960 may be constructed from sheet metal or any other material that contains a degree of resiliency and is configured to at least partially bend/flex but return to a normal unflexed state (e.g., have resiliency).

While not illustrated, the mechanized removal tool 900 may be coupled to the upper portion 220 of the sample well comb 200 and the top edge of one of the glass plates 106 disposed about the electrophoresis gel. More specifically, the flange 956 of the distal end 954 of each engagement member 950 may be inserted into an opening 222 of the upper portion 220 of the sample well comb 200 from the first side 210 of the sample well comb 200. Meanwhile, with the sample well comb 200 still disposed within the electrophoresis gel, the clamp members 960 may be disposed against the glass plate 106 that is disposed against the second side 212 of the sample well comb 200. The user may then engage the knobs 948 of the screw members 940 and rotate the screw members 940 such that the lower ends 946 of the threaded portions 942 of the screw members 940 abut, contact, and/or engage the top edge of the glass plate 106 disposed on the second side 212 of the sample well comb. With the lower ends 946 of the threaded portions 942 of the screw members 940 engaged with the top edge of the glass plate 106, the user may continue to rotate the knobs 948 of the screw members 940 so that the lower ends 946 of the threaded portions 942 extend farther away from the upper platform 930. This causes the rest of the mechanized removal tool 900 to be raised with respect to the top edge of the glass plate 106. With the flanges 956 of the engagement members 950 disposed in the openings 222 of the upper portion 220 of the sample well comb 200, as the mechanized removal tool 900 is raised via the rotation of the screw members 940, the sample well comb 200 is extracted/raised out of the electrophoresis gel. The mechanized removal tool 900 may be raised beyond where the lower portions 964 of the clamp members 960 pass beyond the top edge of the glass plate 106 (and such that the upper portion 220 of the sample well comb 200 passes beyond the top edge of the glass plate 106). At that point the clamp members 960 may spring back toward the second side 212 of the sample well comb 200. In accordance with some embodiments, the clamp members 960 may apply a clamping force onto the upper portion 220 of the sample well comb 200 in order to clamp or capture the upper portion 220 of the sample well comb 200 between the clamp members 960 and the engagement members 950. The clamping force applied by the clamp members 960 may prevent the sample well comb 200 from falling off of (i.e., being disconnected or uncoupled from) the mechanized removal tool 900, and falling into the gel tank 122.

Figure 14A:
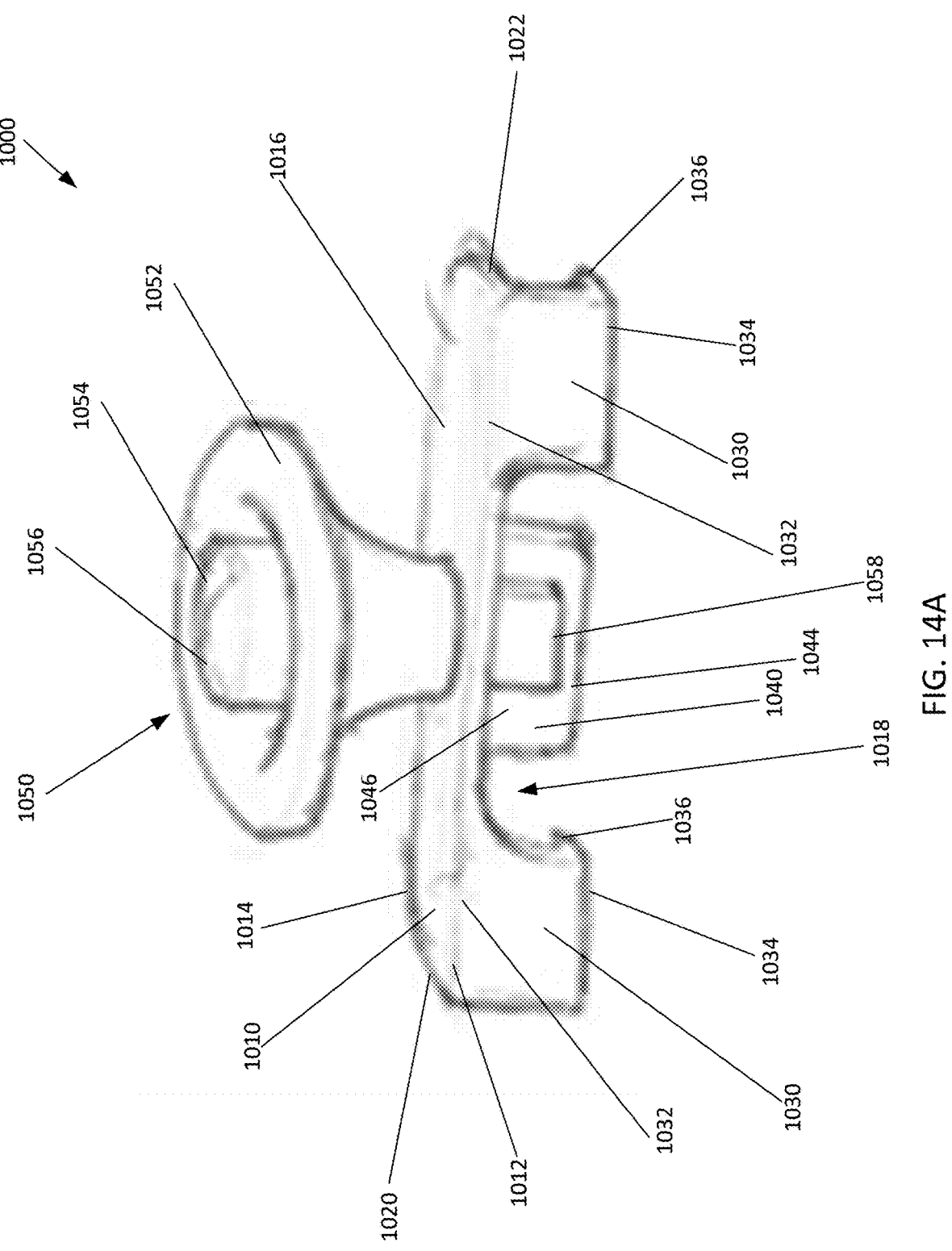
FIG. 14A illustrates a perspective view of a second embodiment of a mechanized removal tool for the sample well comb illustrated in FIGS. 4A and 4B and in accordance with the present disclosure, the illustrated removal tool is both removably couplable to the sample well comb and includes a mechanism for extracting the sample well comb from the electrophoresis gel.
Figure 14B:
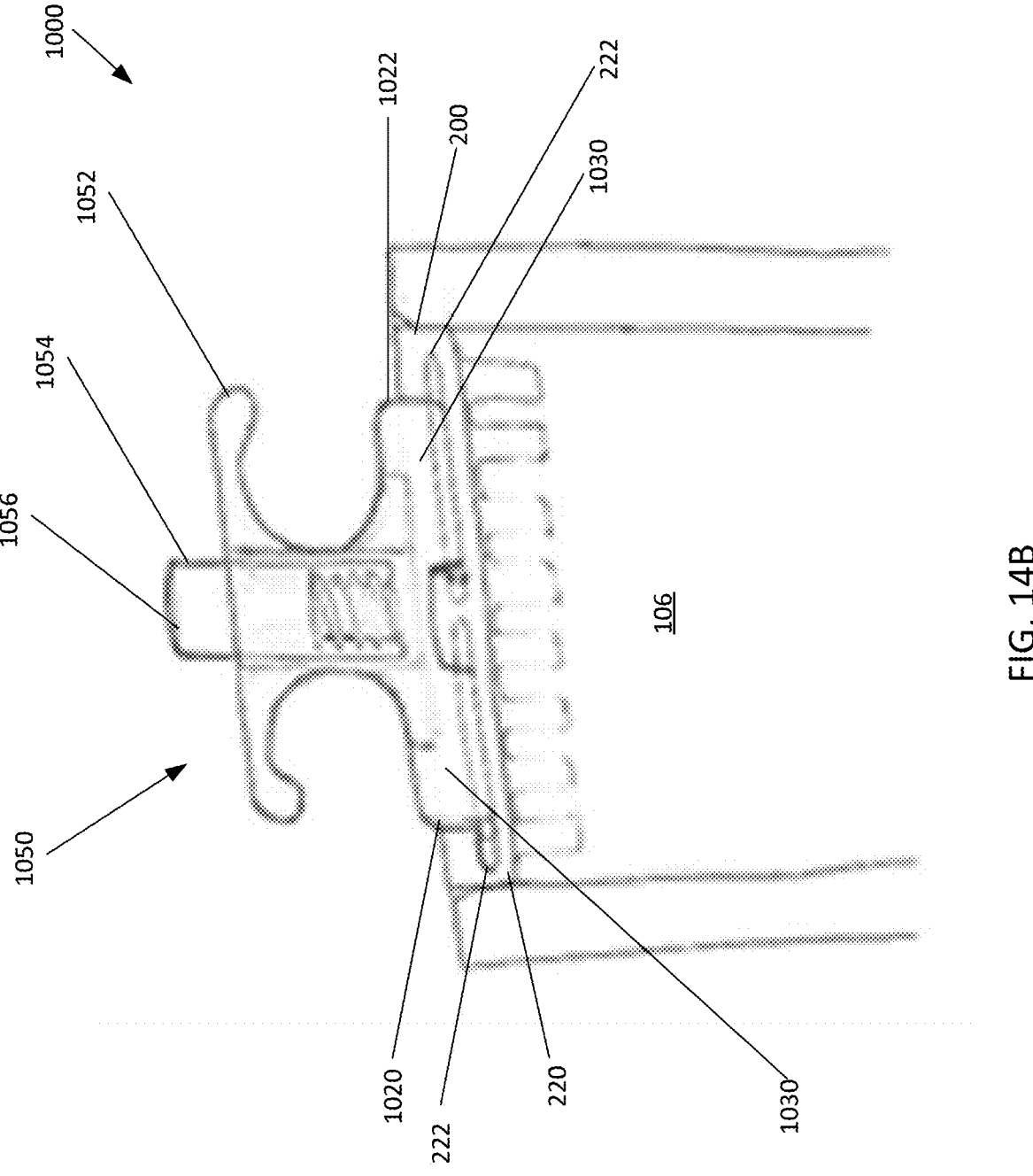
FIG. 14B illustrates a cross-sectional view of the removal tool illustrated in FIG. 14A coupled to a sample well comb.

Turning to FIGS. 14A and 14B, illustrated is a perspective view (FIG. 14A) and a cross-sectional view (FIG. 14B) of a second mechanized embodiment of a removal tool 1000 for the sample well comb 200. Like the mechanized removal tool 900, the mechanized removal tool 1000 may be removably coupled to the sample well comb 200 in order to aid in the removal of the sample well comb 200 from an electrophoresis gel, and may include a mechanism for extracting the sample well comb 200 from the electrophoresis gel. In the illustrated embodiment, the mechanism is a spring-loaded plunger mechanism. As illustrated, the mechanized removal tool 1000 may include a base portion 1010, engagement members 1030, an alignment member 1040, and a plunger mechanism 1050. The base portion 1010 may be substantially planar, may be oriented substantially horizontally, and may include first edge 1012 and an opposite second edge 1014. The base portion 1010 may further include a top surface 1016 spanning between the first edge 1012 and the second edge 1014, an opposite bottom surface 1018 that also spans between the first edge 1012 and the second edge 1014, a first end 1020, and a second end 1022 opposite the first end 1020.

As further illustrated in FIGS. 14A and 14B, the engagement members 1030 may be coupled to, and extend downwardly from, the first edge 1012 of the base portion 1010 such that the engagement members 1030 extend beyond the bottom surface 1018 of the base portion 1010. Each of the engagement members 1030 may include a proximal end 1032, which is coupled to the first edge 1012 of the base portion 1010, and an opposite distal end 1034. Disposed on the distal end 1034 may be a flange 1036, which, as explained further below, is configured to engage/be disposed within the openings 222 of the upper portion 220 of the sample well comb 200. As further illustrated in FIGS. 14A and 14B, one engagement member 1030 may be coupled to the first edge 1012 of the base portion 1010 proximate to the first end 1020, while the other engagement member 1030 may be coupled to the first edge 1012 of the base portion 1010 proximate to the second end 1022.

Continuing with FIGS. 14A and 14B, the alignment member 1040 may be coupled to, and extend downwardly from, the second edge 1014 of the base portion 1010 such that the alignment member 1040 extends beyond the bottom surface 1018 of the base portion 1010. The alignment member 1040 may include a proximal end 1042 (not shown) f, which is coupled to the second edge 1014 of the base portion 1010, and an opposite distal end 1044. The alignment member 1040 may further include an inner surface 1046, which faces the toward the engagement members 1030, and an opposite outer surface 1048 (not shown). As further illustrated in FIGS. 14A and 14B, the alignment member 1040 may be coupled to the second edge 1014 of the base portion 1010 such that it is equidistant from the first and second ends 1020, 1022. In some other embodiments, the mechanized removal tool 1000 may include any number of alignment members 1040.

With further reference to FIGS. 14A and 14B, the plunger mechanism 1050 of the mechanized removal tool 1000 may include a plunger housing 1052 and a plunger 1054. The plunger housing 1052 may be disposed on the top surface 1016 of the base portion 1010. In some embodiments, the plunger housing 1052 may be centrally disposed on the top surface 1016 such that the plunger housing is equidistance from the first and second edges 1012, 1014, and equidistant from the first and second ends 1020, 1022. The plunger 1054 may be movably disposed within the plunger housing 1052 such that the plunger 1054 can translate vertically through the plunger housing 1052 and through the base portion 1010. As illustrated, the plunger 1054 may include an upper end 1056, which is configured to be engaged/pressed by a user, and an opposite lower end 1058, which is configured to engage/contact a top edge of a glass plate 106 disposed about the electrophoresis gel. The plunger 1054 may be configured to translate between an upper position (shown in FIGS. 14A and 14B), where the plunger 1054 does not impart a force onto the top edge of a glass plate 106 capable of raising the mechanized removal tool 1000 and the sample well comb 200 with respect to the electrophoresis gel and the glass plate 106, and a lowered position (not shown), where the lower end 1058 of the plunger 1054 has imparted a force onto the top edge of the glass plate 106 that raises the mechanized removal tool 1000 and the sample well comb 200 with respect to the electrophoresis gel and the glass plate 106. As further illustrated in FIGS. 14A and 14B, a spring 1060 may be disposed within the plunger 1054 and/or within the plunger housing 1052 in order to bias the plunger 1054 to the raised position.

As best illustrated in FIG. 14B, the mechanized removal tool 1000 may be coupled to the upper portion 220 of the sample well comb 200 and the top edge of one of the glass plates 106 disposed about the electrophoresis gel. More specifically, the flange 1036 of the distal end 1034 of each engagement member 1030 may be inserted into an opening 222 of the upper portion 220 of the sample well comb 200 from the first side 210 of the sample well comb 200. Meanwhile, with the sample well comb 200 still disposed within the electrophoresis gel, the inner surface 1046 of the alignment member 1040 may be disposed against the glass plate 106 that is disposed against the second side 212 of the sample well comb 200. The user may then depress the plunger 1054 to impart a force onto the top edge of the glass plate 106 via the lower end 1058 of the plunger 1054 that is in abutment/contact/engagement with the top edge of the glass plate 106. The user may depress the plunger 1054 while holding onto the plunger housing 1052 and/or the base portion 1010 of the mechanized removal tool 1000. This results in the mechanized removal tool 1000 being raised with respect to the top edge of the glass plate 106. With the flanges 1036 of the engagement members 1030 disposed in the openings 222 of the upper portion 220 of the sample well comb 200, as the mechanized removal tool 1000 is raised via the plunger mechanism 1050, the sample well comb 200 is extracted/raised out of the electrophoresis gel. The mechanized removal tool 1000 may be raised beyond where the distal end 1044 of the alignment member 1040 passes beyond the top edge of the glass plate 106 (and such that the upper portion 220 of the sample well comb 200 passes beyond the top edge of the glass plate 106). In accordance with some embodiments, the depressed plunger 1054 may further serve, in the lowered position, to retain the sample well comb 200 on the engagement members 1030 in order to prevent the sample well comb 200 from falling off of (i.e., being disconnected or uncoupled from) the mechanized removal tool 1000, and falling into the gel tank 122.

Figure 15:
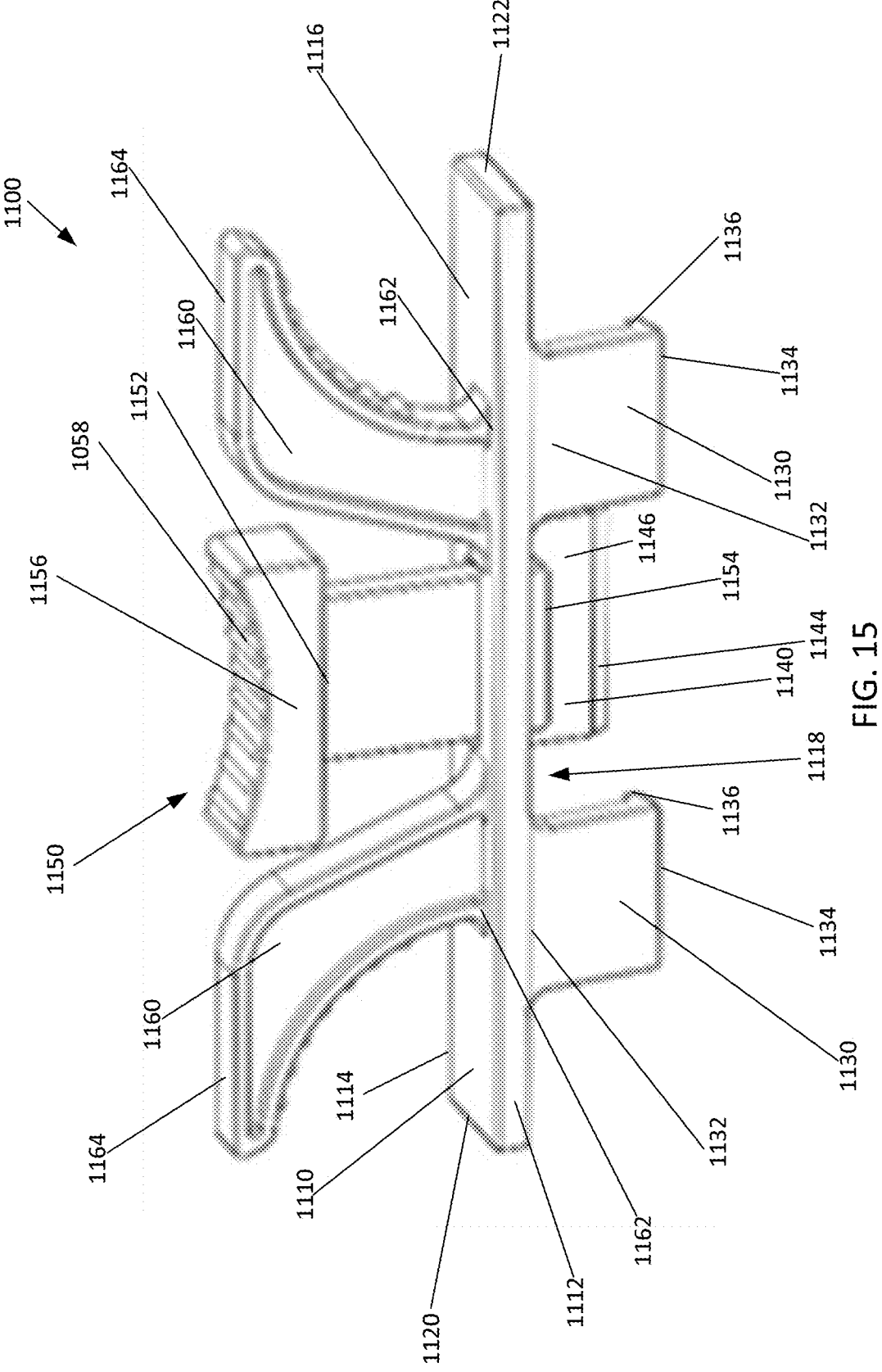
FIG. 15 illustrates a perspective view of a third embodiment of a mechanized removal tool for the sample well comb illustrated in FIGS. 4A and 4B and in accordance with the present disclosure, the illustrated removal tool is both removably couplable to the sample well comb and includes a mechanism for extracting the sample well comb from the electrophoresis gel.

Turning to FIG. 15, illustrated is a perspective view of another embodiment of a mechanized removal tool 1100 configured to aid in the removal of a sample well comb 200 from an electrophoresis gel. Like the mechanized removal tools 900 and 1000, the mechanized removal tool 1000 may be removably coupled to the sample well comb 200 in order to aid in the removal of the sample well comb 200 from an electrophoresis gel, and may include a mechanism for extracting the sample well comb 200 from the electrophoresis gel. Like the mechanized removal tool 1000, the mechanized removal tool 1100 illustrated in FIG. 15 may include a plunger mechanism. More specifically, and as further illustrated, the mechanized removal tool 1100 may include a base portion 1110, engagement members 1130, an alignment member 1140, a plunger 1150, and handles 1160. The base portion 1110 may be substantially planar, may be oriented substantially horizontally, and may include first edge 1112 and an opposite second edge 1114. The base portion 1110 may further include a top surface 1116 spanning between the first edge 1112 and the second edge 1114, an opposite bottom surface 1118 that also spans between the first edge 1112 and the second edge 1114, a first end 1120, and a second end 1122 opposite the first end 1120.

As further illustrated in FIG. 15, the engagement members 1130 may be coupled to, and extend downwardly from, the first edge 1112 of the base portion 1110 such that the engagement members 1130 extend beyond the bottom surface 1118 of the base portion 1110. Each of the engagement members 1130 may include a proximal end 1132, which is coupled to the first edge 1112 of the base portion 1110, and an opposite distal end 1134. Disposed on the distal end 1134 may be a flange 1136, which, as explained further below, is configured to engage/be disposed within the openings 222 of the upper portion 220 of the sample well comb 200. As further illustrated in FIG. 15, one engagement member 1130 may be coupled to the first edge 1112 of the base portion 1110 more proximate to the first end 1120 than the second end 1122, but spaced from the first end 1120. The other engagement member 1130 may be coupled to the first edge 1112 of the base portion 1110 more proximate to the second end 1122 than the first end 1120, but spaced from the second end 1122.

Continuing with FIG. 15, the alignment member 1140 may be coupled to, and extend downwardly from, the second edge 1114 of the base portion 1110 such that the alignment member 1140 extends beyond the bottom surface 1118 of the base portion 1110. The alignment member 1140 may include a proximal end 1142 (not shown), which is coupled to the second edge 1114 of the base portion 1110, and an opposite distal end 1144. The alignment member 1140 may further include an inner surface 1146, which faces the toward the engagement members 1130, and an opposite outer surface 1148 (not shown). As further illustrated in FIG. 15, the alignment member 1140 may be coupled to the second edge 1114 of the base portion 1110 such that it is equidistant from the first and second ends 1120, 1122. In some other embodiments, the mechanized removal tool 1100 may include any number of alignment members 1140.

With further reference to FIG. 15, the plunger 1150 be substantially linear, and may include an upper end 1152 and a lower end 1154. The plunger 1150 may be configured to extend through an opening in the base portion 1110 such that the upper end 1152 is disposed above the top surface 1116 of the base portion 1110, and such that the lower end 1154 is disposed below the bottom surface 1118 of the base portion 1110. The plunger 1150 may be configured to slide through the base portion 1110. In some embodiments, like that illustrated in FIG. 15, the upper end 1152 of the plunger 1150 may have an upper portion 1156 that is wider than the rest of the plunger 1150, as well as the opening in the base portion 1110, and that includes a grip surface 1158 that is configured to receive a user's finger (e.g., thumb, index, etc.). The plunger 1150 may be configured to slide through the opening in the base portion 1110 in order to be reconfigured from a raised position, where the upper portion 1156 of the plunger 1150 is spaced from the top surface 1116 of the base portion 1110, to a lowered position, where the upper portion 1156 is disposed adjacent or in abutment with the top surface 1116 of the base portion 1110, and vice versa. The lower end 1154 of the plunger 1150 may be configured to engage/contact a top edge of a glass plate 106 disposed about the electrophoresis gel. In the raised position, the plunger 1054 does not impart a force onto the top edge of a glass plate 106 capable of raising the mechanized removal tool 1100 and the sample well comb 200 with respect to the electrophoresis gel and the glass plate 106. Conversely, translating the plunger from the raised position to the lowered position (not shown), causes the plunger 1150 to impart a force onto the top edge of the glass plate 106 that raises the mechanized removal tool 1100 and the sample well comb 200 with respect to the electrophoresis gel and the glass plate 106.

With further regard to FIG. 15, the handles 1160 may be disposed on the top surface 1116 of the base portion 1110 such that the handles 1160 extend substantially upward from the top surface 1116 of the base portion 1110. The handles 1160 may each include a proximal end 1162, which is coupled to the top surface 1116 of the base portion 1110, and an opposite distal end 1164, which is spaced from the top surface 1116 of the base portion 1110. The handles 1160 may have a substantially arcuate shape in order to facilitate the grip/grasp of a user of the mechanized removal tool 1100.

While not illustrated, the mechanized removal tool 1100 may be coupled to the upper portion 220 of a sample well comb 200 and the top edge of one of the glass plates 106 disposed about the electrophoresis gel. More specifically, the flange 1136 of the distal end 1134 of each engagement member 1130 may be inserted into an opening 222 of the upper portion 220 of the sample well comb 200 from the first side 210 of the sample well comb 200. Meanwhile, with the sample well comb 200 still disposed within the electrophoresis gel, the inner surface 1146 of the alignment member 1140 may be disposed against the glass plate 106 that is disposed against the second side 212 of the sample well comb 200. The user may then depress the plunger 1150 while holding the handles 1160 to slide the upper portion 1156 of the plunger 1150 toward the top surface 1116 of the base portion 1110 and slide the lower end 1154 of the plunger 1150 away from the bottom surface 1118 of the base portion 1110. This results in the lower end 1154 of the plunger 1150 impacting the top edge of the glass plate 106 and imparting a force onto the top edge of the glass plate 106. As the user continues to depress the plunger 1150 the mechanized removal tool 1100 may be raised with respect to the top edge of the glass plate 106. Because the flanges 1136 of the engagement members 1130 are disposed in the openings 222 of the upper portion 220 of the sample well comb 200, as the mechanized removal tool 1100 is raised via the plunger 1150, the sample well comb 200 is extracted/raised out of the electrophoresis gel. The mechanized removal tool 1100 may be raised beyond where the distal end 1144 of the alignment member 1140 passes beyond the top edge of the glass plate 106 (and such that the upper portion 220 of the sample well comb 200 passes beyond the top edge of the glass plate 106). In accordance with some embodiments, the depressed plunger 1150 may further serve, in that instance, to retain the sample well comb 200 on the engagement members 1130 in order to prevent the sample well comb 200 from falling off of (i.e., being disconnected or uncoupled from) the mechanized removal tool 1100, and falling into the gel tank 122.

Figure 16:
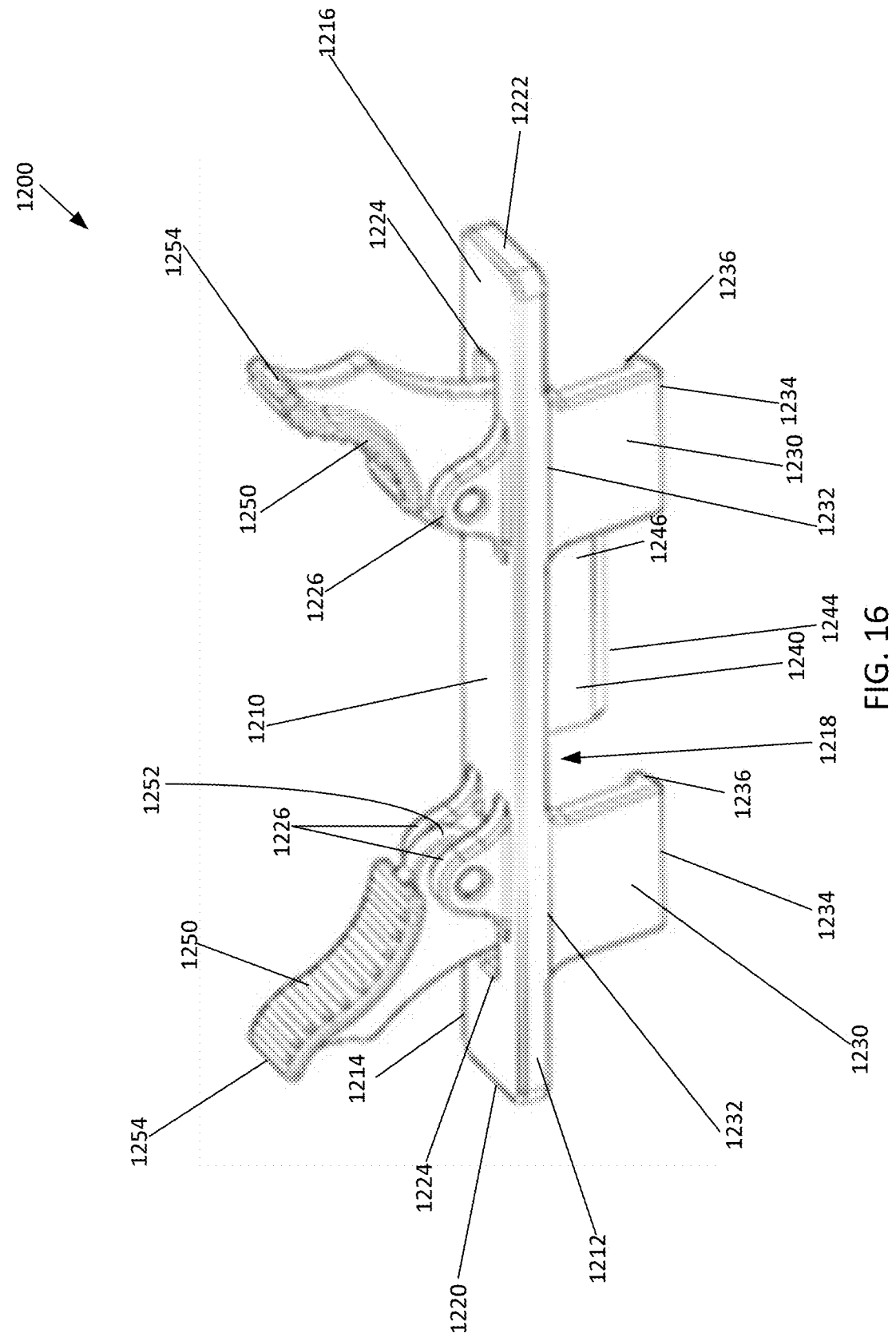
FIG. 16 illustrates a perspective view of a fourth embodiment of a mechanized removal tool for the sample well comb illustrated in FIGS. 4A and 4B and in accordance with the present disclosure, the illustrated removal tool is both removably couplable to the sample well comb and includes a mechanism for extracting the sample well comb from the electrophoresis gel.

Turning to FIG. 16, illustrated is a perspective view of another embodiment of a mechanized removal tool 1200 configured to aid in the removal of a sample well comb 200 from an electrophoresis gel. Like the mechanized removal tools 900, 1000, and 1100, the mechanized removal tool 1200 may be removably coupled to the sample well comb 200 in order to aid in the removal of the sample well comb 200 from an electrophoresis gel, and may include a mechanism for extracting the sample well comb 200 from the electrophoresis gel. The mechanized removal tool 1200 illustrated in FIG. 16 may include a cam mechanism. More specifically, and as further illustrated, the mechanized removal tool 1200 may include a base portion 1210, engagement members 1230, an alignment member 1240, and cam members 1250. The base portion 1210 may be substantially planar, may be oriented substantially horizontally, and may include first edge 1212 and an opposite second edge 1214. The base portion 1210 may further include a top surface 1216 spanning between the first edge 1212 and the second edge 1214, an opposite bottom surface 1218 that also spans between the first edge 1212 and the second edge 1214, a first end 1220, and a second end 1222 opposite the first end 1220.

Continuing with FIG. 16, the base portion 1210 further includes a pair of openings 1224 that extend through the base portion 1210 from the top surface 1216 to the bottom surface 1218. The openings 1224 may be disposed in the base portion 1210 such that the openings 1224 are equidistant from the first edge 1212 and the second edge 1214. One opening 1224 may be disposed in the base portion 1210 more proximate to the first end 1220 than the second end 1222, but spaced from the first end 1220. The other opening 1224 may be disposed in the base portion 1210 more proximate to the second end 1222 than the first end 1220, but spaced from the second end 1222.

Proximate to each opening 1224 is a pair of projections 1226 that extend upwardly from the top surface 1216 of the base portion 1210. Each projection 1226 may be oriented on the top surface 1216 of the base portion 1210 between one of the openings 1224 and either the first edge 1212 or the second edge 1214 of the base portion 1210. Moreover, each projection 1226 of the pair of projections 1226 may be aligned with one another across the respective opening 1224.

As further illustrated in FIG. 16, the engagement members 1230 may be coupled to, and extend downwardly from, the first edge 1212 of the base portion 1210 such that the engagement members 1230 extend beyond the bottom surface 1218 of the base portion 1210. Each of the engagement members 1230 may include a proximal end 1232, which is coupled to the first edge 1212 of the base portion 1210, and an opposite distal end 1234. Disposed on the distal end 1234 may be a flange 1236, which, as explained further below, is configured to engage/be disposed within the openings 222 of the upper portion 220 of the sample well comb 200. As further illustrated in FIG. 16, one engagement member 1230 may be coupled to the first edge 1212 of the base portion 1210 more proximate to the first end 1220 than the second end 1222, but spaced from the first end 1220. The other engagement member 1230 may be coupled to the first edge 1212 of the base portion 1210 more proximate to the second end 1222 than the first end 1220, but spaced from the second end 1222.

Continuing with FIG. 16, the alignment member 1240 may be coupled to, and extend downwardly from, the second edge 1214 of the base portion 1210 such that the alignment member 1240 extends beyond the bottom surface 1218 of the base portion 1210. The alignment member 1240 may include a proximal end 1242 (not shown), which is coupled to the second edge 1214 of the base portion 1210, and an opposite distal end 1244. The alignment member 1240 may further include an inner surface 1246, which faces the toward the engagement members 1230, and an opposite outer surface 1248 (not shown). As further illustrated in FIG. 16, the alignment member 1240 may be coupled to the second edge 1214 of the base portion 1210 such that it is equidistant from the first and second ends 1220, 1222. In some other embodiments, the mechanized removal tool 1200 may include any number of alignment members 1240.

With further reference to FIG. 16, the mechanized removal tool 1200 includes a pair of cam members 1250. Each cam member 1250 may be rotatably coupled to a pair of projections 1226, and may be at least partially disposed within an opening 1224 of the base portion 1210. Each cam member 1250 may include a proximal end 1252, which is rotatably coupled to the pair of projections 1226, and an opposite distal end 1254. Extending between the proximal end 1252 and the distal end 1254 may be a handle surface 1256 and a cam surface 1258, which is opposite of the handle surface 1256. The cam members 1250 may be rotatable about rotational axis X between a raised position, where the distal ends 1254 of the cam members 1250 are spaced from the top surface 1216 of the base portion 1210, and a lowered position, where the distal ends 1254 of the cam members 1250 are disposed proximate to the top surface 1216 of the base portion 1210. When the cam members 1250 are in the raised position, like that shown in FIG. 16, at least a portion of the cam surface 1256 may be disposed within the opening 1224 of the base portion 1210. However, when the cam members 1250 are in the lowered position, at least a portion of the cam surface 1256 may extend through the opening 1224 and downwardly beyond the bottom surface 1218 of the base portion 1210. A user may depress the handle surfaces 1256 in order to rotate the cam members 1250 from the raised position to the lowered position.

While not illustrated, the mechanized removal tool 1200 may be coupled to the upper portion 220 of a sample well comb 200 and the top edge of one of the glass plates 106 disposed about the electrophoresis gel. More specifically, the flange 1236 of the distal end 1234 of each engagement member 1230 may be inserted into an opening 222 of the upper portion 220 of the sample well comb 200 from the first side 210 of the sample well comb 200. Meanwhile, with the sample well comb 200 still disposed within the electrophoresis gel, the inner surface 1246 of the alignment member 1240 may be disposed against the glass plate 106 that is disposed against the second side 212 of the sample well comb 200. The user may then depress the handle surfaces 1256 of the cam members 1250 to rotate the cam members 1250 from the raised position to the lowered position. This results in the cam surfaces 1258 of the cam members 1250 sliding through the openings 1224 and impacting the top edge of the glass plate 106, which, in turn, imparts a force onto the top edge of the glass plate 106. As the user continues to depress the cam members 1250, the mechanized removal tool 1200 may be raised with respect to the top edge of the glass plate 106 due to the cam surfaces 1258 acting on the top edges of the glass plate 106. Because the flanges 1236 of the engagement members 1230 are disposed in the openings 222 of the upper portion 220 of the sample well comb 200, as the mechanized removal tool 1200 is raised via the cam members 1250, the sample well comb 200 is extracted/raised out of the electrophoresis gel. The mechanized removal tool 1200 may be raised beyond where the distal end 1244 of the alignment member 1240 passes beyond the top edge of the glass plate 106 (and such that the upper portion 220 of the sample well comb 200 passes beyond the top edge of the glass plate 106). In accordance with some embodiments, the cam surfaces 1258, when the cam members 1250 are in the lowered position, may further serve to retain the sample well comb 200 on the engagement members 1230 in order to prevent the sample well comb 200 from falling off of (i.e., being disconnected or uncoupled from) the mechanized removal tool 1200, and falling into the gel tank 122.

Turning to FIGS. 17A-17G, illustrated are various views of a removal tool 1300 configured to aid in the removal of a sample well comb 200 from an electrophoresis gel where the removal tool 1300 is configured to be retrofitted to a sample well comb 200 like that illustrated in FIGS. 4A and 4B. Unlike the removal tools 300, 400, 500, 600, 700, 800, 900, 1000, 1100, and 1200 disclosed above, the removal tool 1300 may be permanently coupled to the sample well comb 200 in order to provide additional surface area to aid in the removal of the sample well comb 200 from an electrophoresis gel. The removal tool 1300 may include an upper portion 1310, which may serve as the additional surface area that a user may grip, grasp, or engage with to remove the sample well comb 200, and a lower portion 1330 that may be directly coupled to the first side 210 of a sample well comb 200. The upper portion 1310 may include first side 1312 and an opposite second side 1314. The upper portion

1310 may further include a top edge 1316, an opposite bottom edge 1318, a first end 1320 spanning between the top edge 1316 and the bottom edge 1318, and a second end 1322 opposite the first end 1320 and also spanning between the top edge 1316 and the bottom edge 1318. As further illustrated, the upper portion 1310 further includes an opening 1324 defines a handle to be grabbed by a user of the removal tool 1300. The opening 1324 illustrated in FIGS. 17A, 17D, and 17E may span across the majority of the upper portion 1310. In some other embodiments, the upper portion 1310 may include a plurality of openings that define multiple handles to be grabbed by a user of the removal tool 1300. While FIGS. 17A, 17B, 17D, and 17E illustrate that the top edge 1316 may contain a series of horizontal and angled sections, other embodiments of the top edge 1316 may only be horizontal, may only be angled, may include vertical sections, or may contain any combination of a number of sections.

Continuing with FIGS. 17A-17G, the lower portion 1310 may include a first side 1332 and an opposite second side 1334. The lower portion 1330 may further include a top edge 1336, an opposite bottom edge 1338, a first end 1340 spanning between the top edge 1336 and the bottom edge 1338, and a second end 1342 opposite the first end 1340 and also spanning between the top edge 1336 and the bottom edge 1338. The top edge 1336 of the lower portion 1330 may be coupled to the bottom edge 1318 of the upper portion 1310. As further illustrated, the lower portion 1330 includes a ridge 1360 extending from the first side 1332 proximate to the top edge 1336 of the lower portion 1330. The ridge 1360 may span across the first side 1332 of the lower portion 1330 from the first end 1340 to the second end 1342. Disposed below the ridge 1360 may be a pair of viewing openings 1350. One of the viewing openings 1350 may be disposed proximate to the first end 1340, while the other viewing opening 1350 may be disposed proximate to the second end 1342. As explained in further detail below, when the removal tool 1300 is coupled to a sample well comb 200, the viewing openings 1350 may enable a user to still view the text disposed on the first side 210 of the sample well comb 200 between the upper ridge 224 and the openings 222.

Figures 17A, 17B, 17C, 17D, 17E:
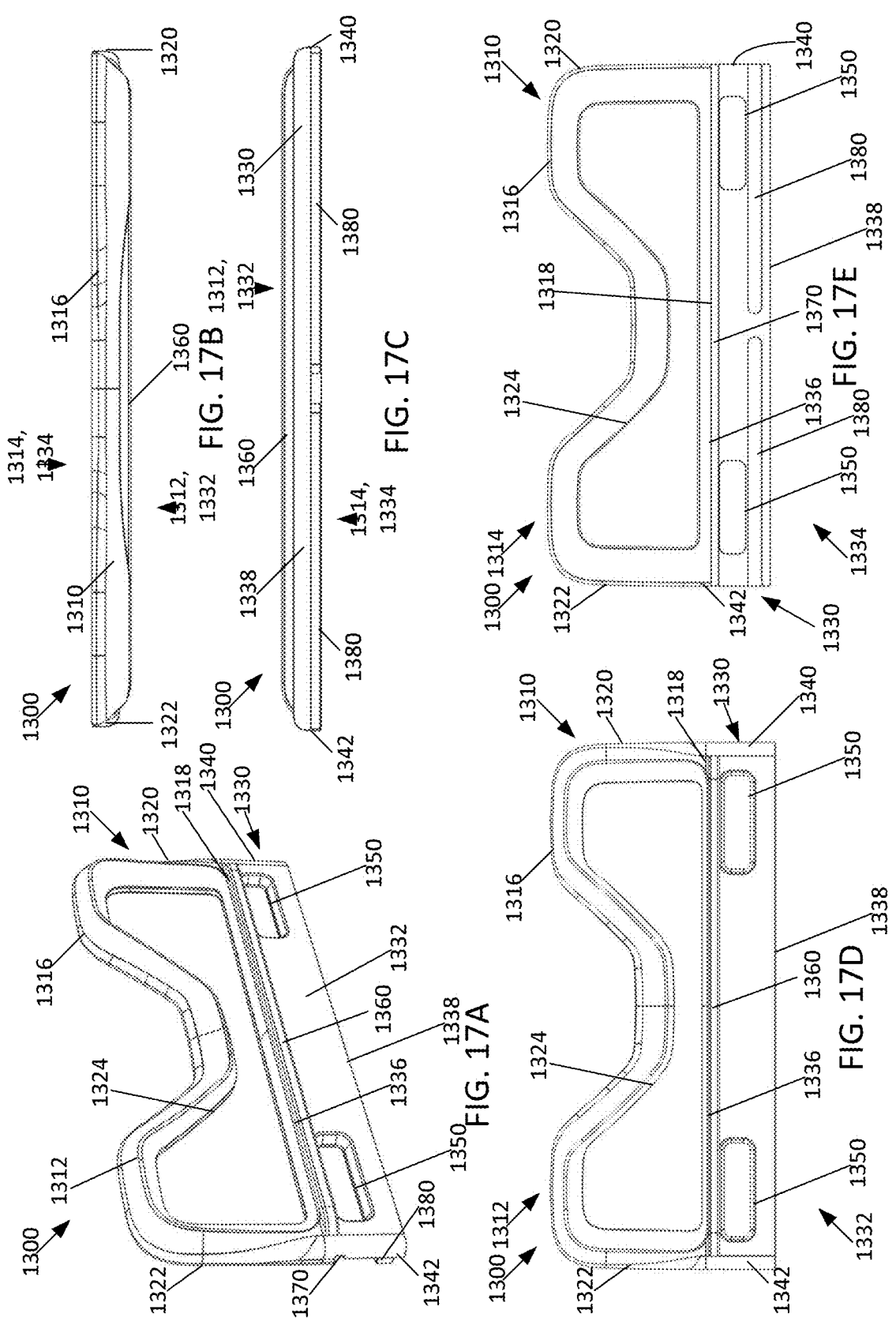
FIGS. 17A-17G illustrate various views (perspective, top, bottom, front, rear, left, and right) of an embodiment of a removal tool that is configured to be retrofitted onto the sample well comb illustrated in FIGS. 4A and 4B in order to facilitate removal of the sample well comb from an electrophoresis gel in accordance with the present disclosure.
Figure 17G:
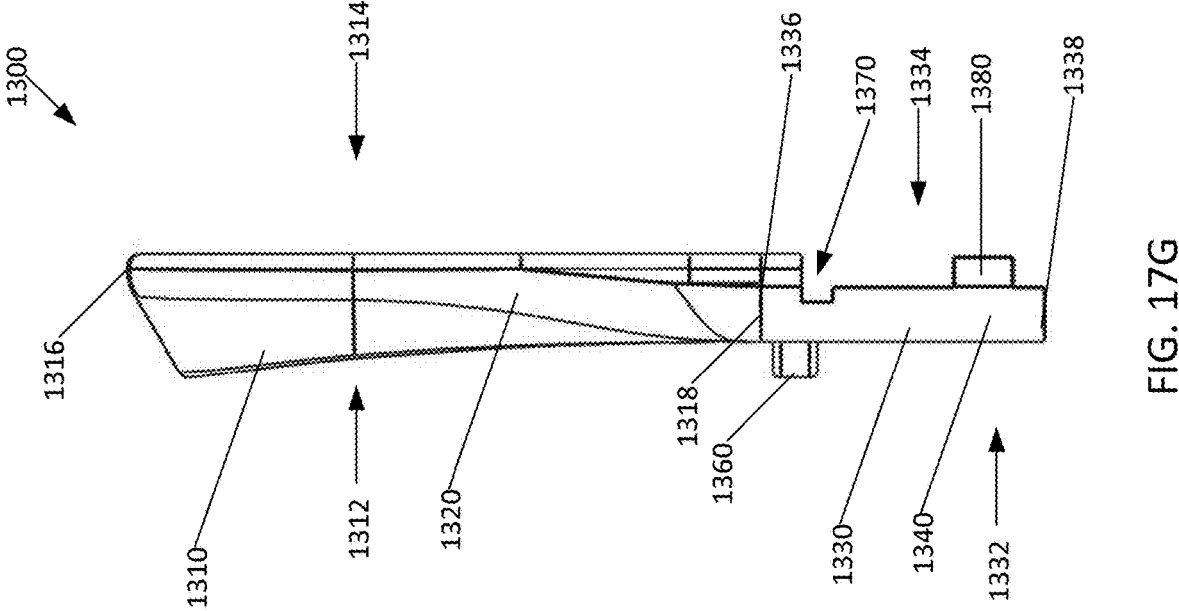
Figure 17F:
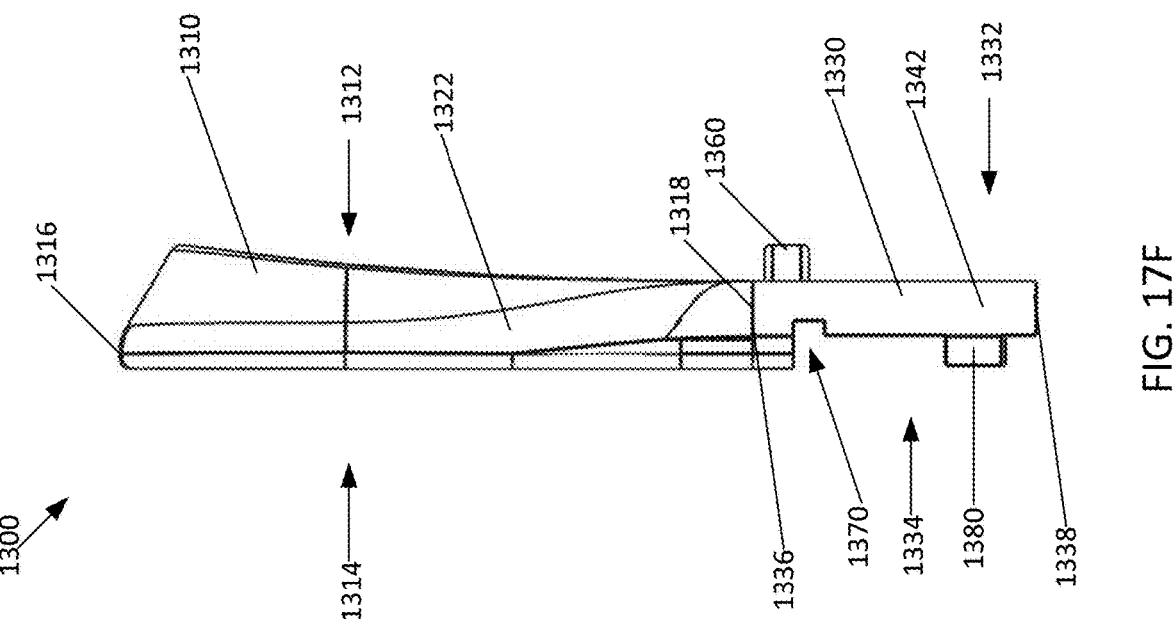

As best illustrated in FIGS. 17E-17G, the second side 1334 of the lower portion 1330 includes a channel 1370 and a pair of projections 1380. The channel 1370 may be disposed in the second side 1334 of the lower portion 1330 proximate to the top edge 1336 of the lower portion 1330 and above the viewing openings 1350. Moreover, the channel 1370 may span across the second side 1334 of the lower portion 1330 from the first end 1340 to the second end 1342. As further illustrated, the projections 1380 may extend outwardly (and in some embodiments, perpendicularly) from the second side 1334 of the lower portion 1330, where the projections 1380 may be sized and shaped to fit within the openings 222 of the upper portion 220 of the sample well comb 200. Furthermore, the projections 1380 may be dispose below the viewing openings 1350. As best illustrated in FIG. 17E, one projection 1380 may extend along the second side 1334 of the lower portion 1330 from the first end 1340, while the other projection may extend along the second side 1334 of the lower portion 1330 from the second end 1342.

Figure 18A:
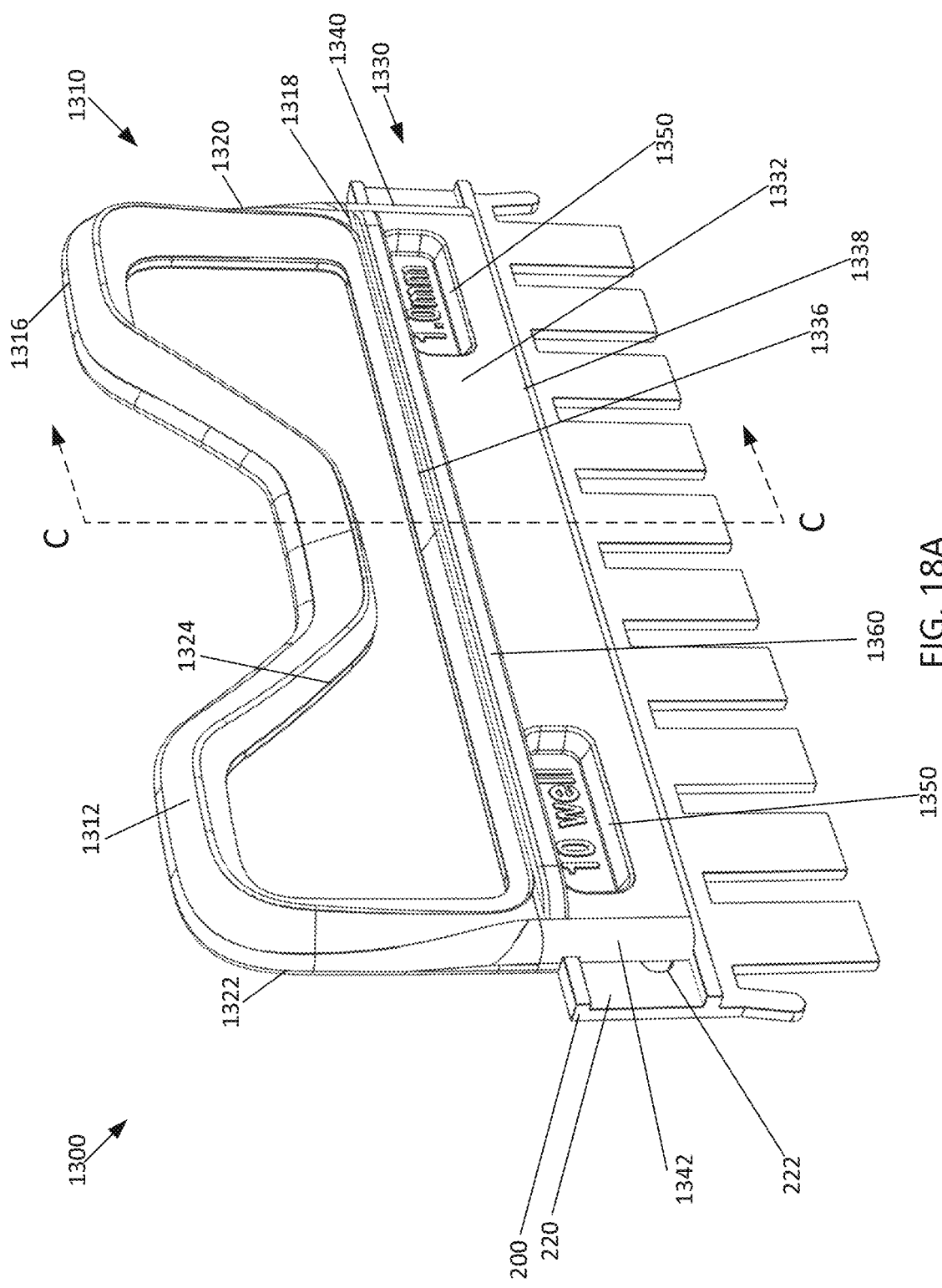
FIGS. 18A-18G illustrate various views (perspective, top, bottom, front, rear, left, and right) of the removal tool illustrated in FIGS. 17A-17G coupled to the sample well comb illustrated in FIGS. 4A and 4B and in accordance with the present disclosure.
Figures 18B, 18C:
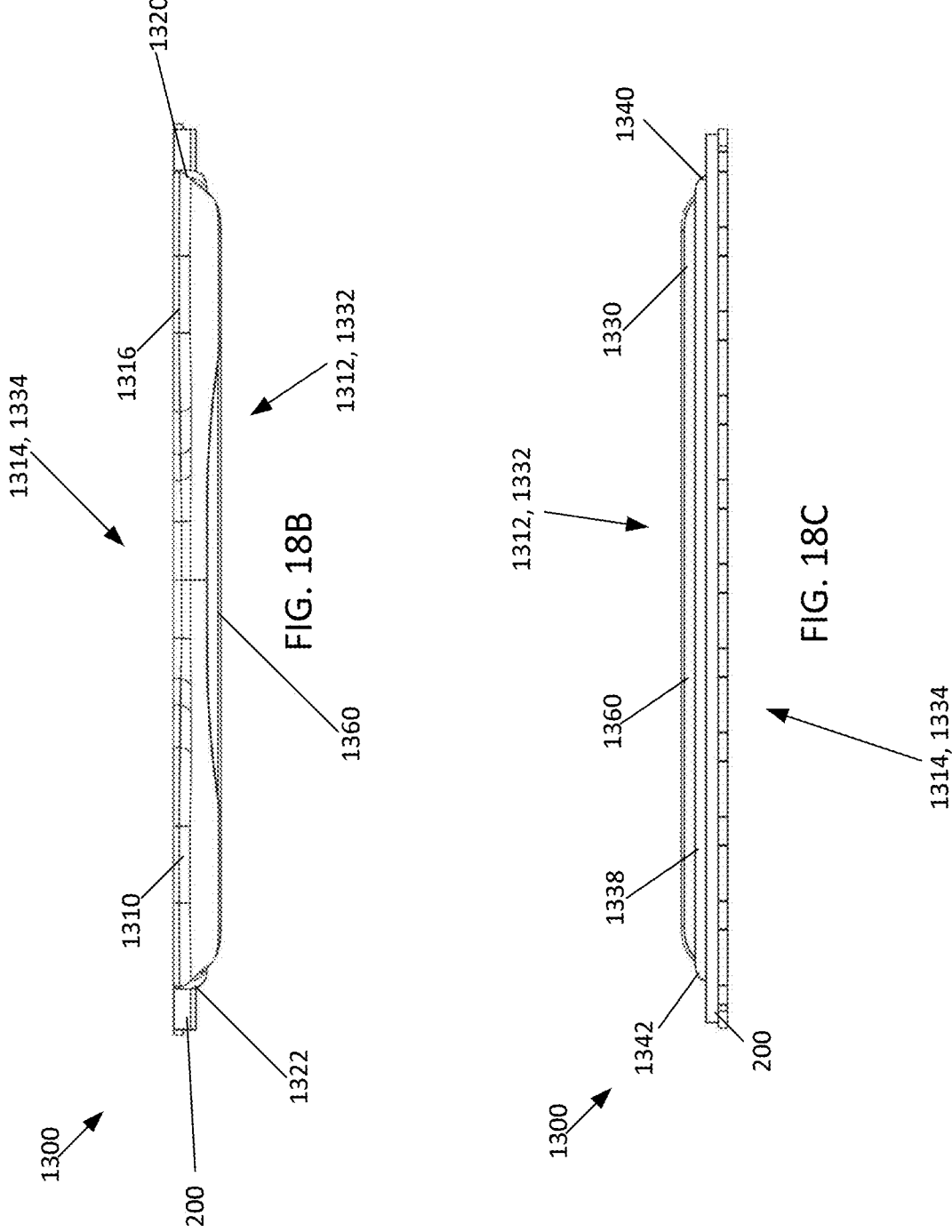
Figures 18D, 18E:
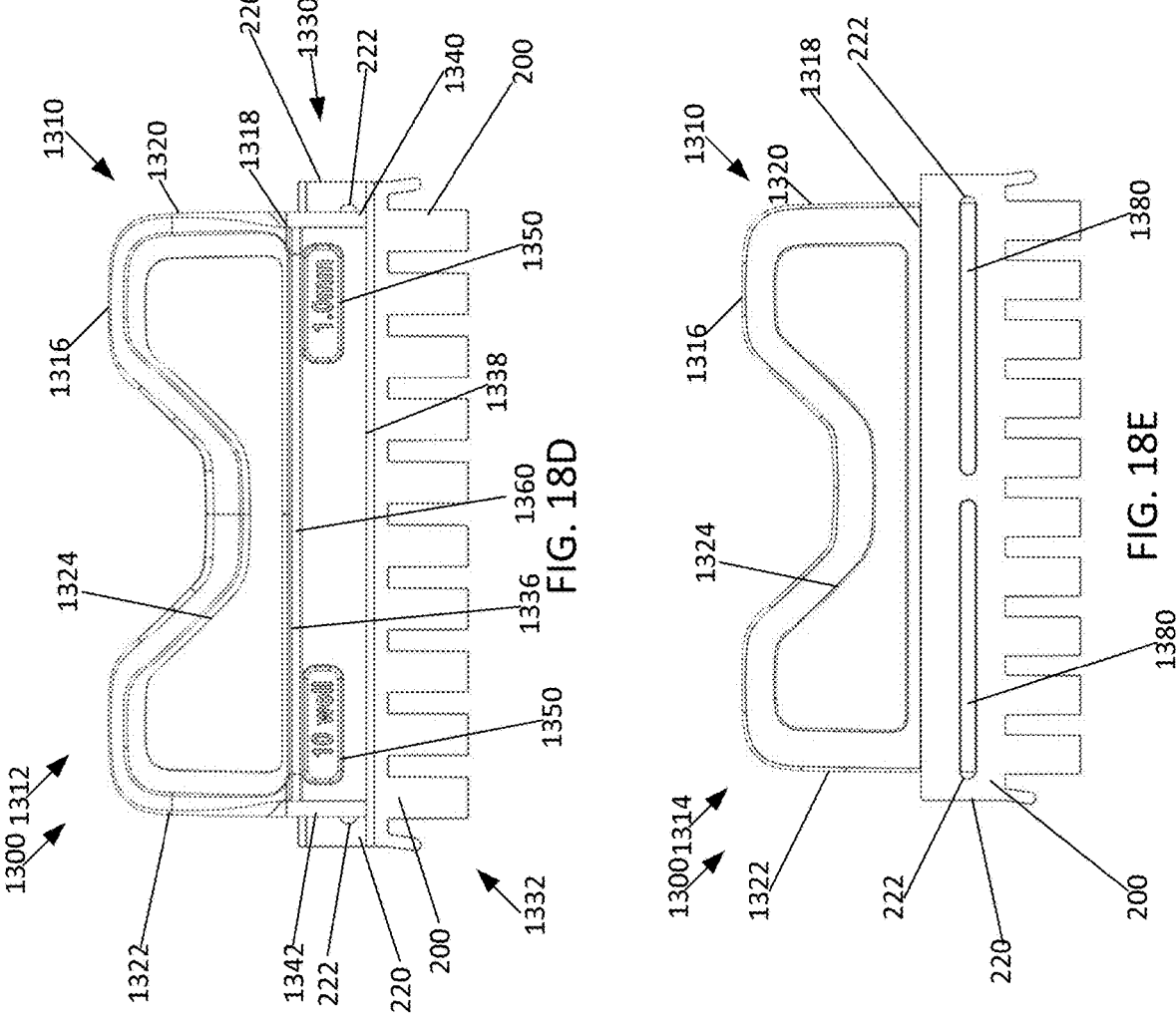
Figures 18F, 18G, 18H:
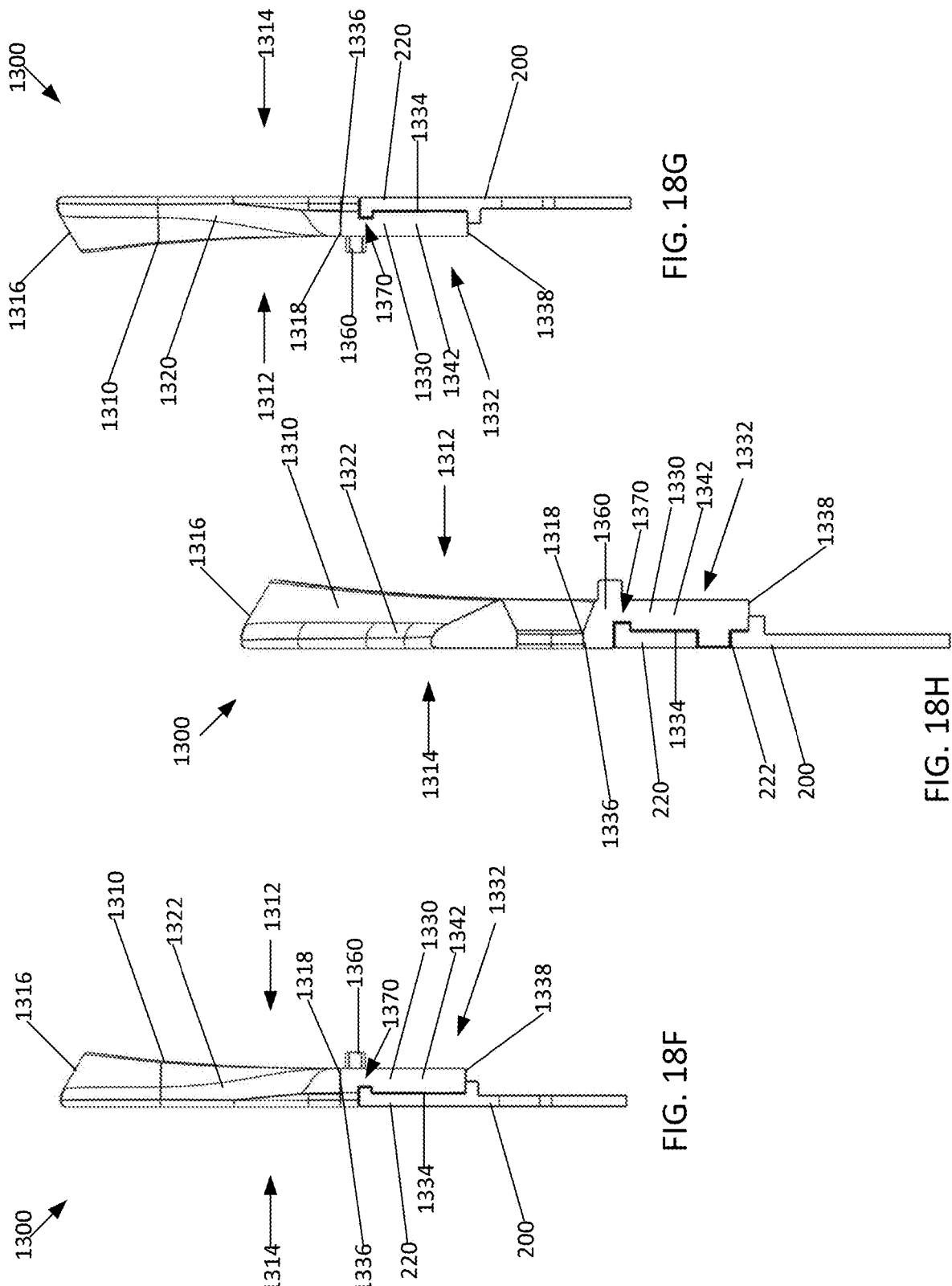
FIG. 18H illustrates a cross-sectional view of the removal tool illustrated in FIGS. 17A-17G and the sample well comb illustrated in FIGS. 4A and 4B, where the removal tool is coupled to the sample well comb like that illustrated in FIG. 18A, the cross-sectional view being taken along line C-C in FIG. 18A.

Turning to FIGS. 18A-18H, illustrated are various views of the removal tool 1300 coupled to the sample well comb 200. More specifically, when coupled to one another, the second side 1334 of the lower portion 1330 of the removal tool 1300 may be in abutment with the upper portion 220 of the sample well comb 200 on the first side 210 of the sample well comb 200. As best illustrated in FIGS. 18F-18H, the channel 1370 of the lower portion 1330 of the removal tool 1300 is configured to receive the upper ridge 224 of the upper portion 220 of the sample well comb 200, while the projections 1380 of the lower portion 1330 of the removal tool 1300 are configured to be disposed within the openings 222 of the upper portion 220 of the sample well comb 200. Moreover, the bottom edge 1338 of the lower portion 1330 of the removal tool 1300 may be in abutment with the lower ridge 226 of the sample well comb 200. Retuning to FIGS. 18A and 18D, when the removal tool 1300 is coupled to the sample well comb 200, the text on the first side 210 of the upper portion 220 of the sample well comb 200 is visible through the viewing openings 1350 of the lower portion 1330 of the removal tool 1300.

As further illustrated in FIGS. 18A-18H, when the removal tool 1300 is coupled to the sample well comb 200, the upper portion 1310 of the removal tool 1300 extends above the top end 202 of the sample well comb 200. The removal tool 1300 may be coupled to the sample well comb 200 via any know attachment or coupling method, including, but not limited to, adhesives (e.g., glue, epoxies, etc.), bonding (e.g., ultrasonic welding, injection molding, etc.), fasteners (e.g., screws, bolts, clips, snaps, friction fit, etc.), etc.

Figure 19A:
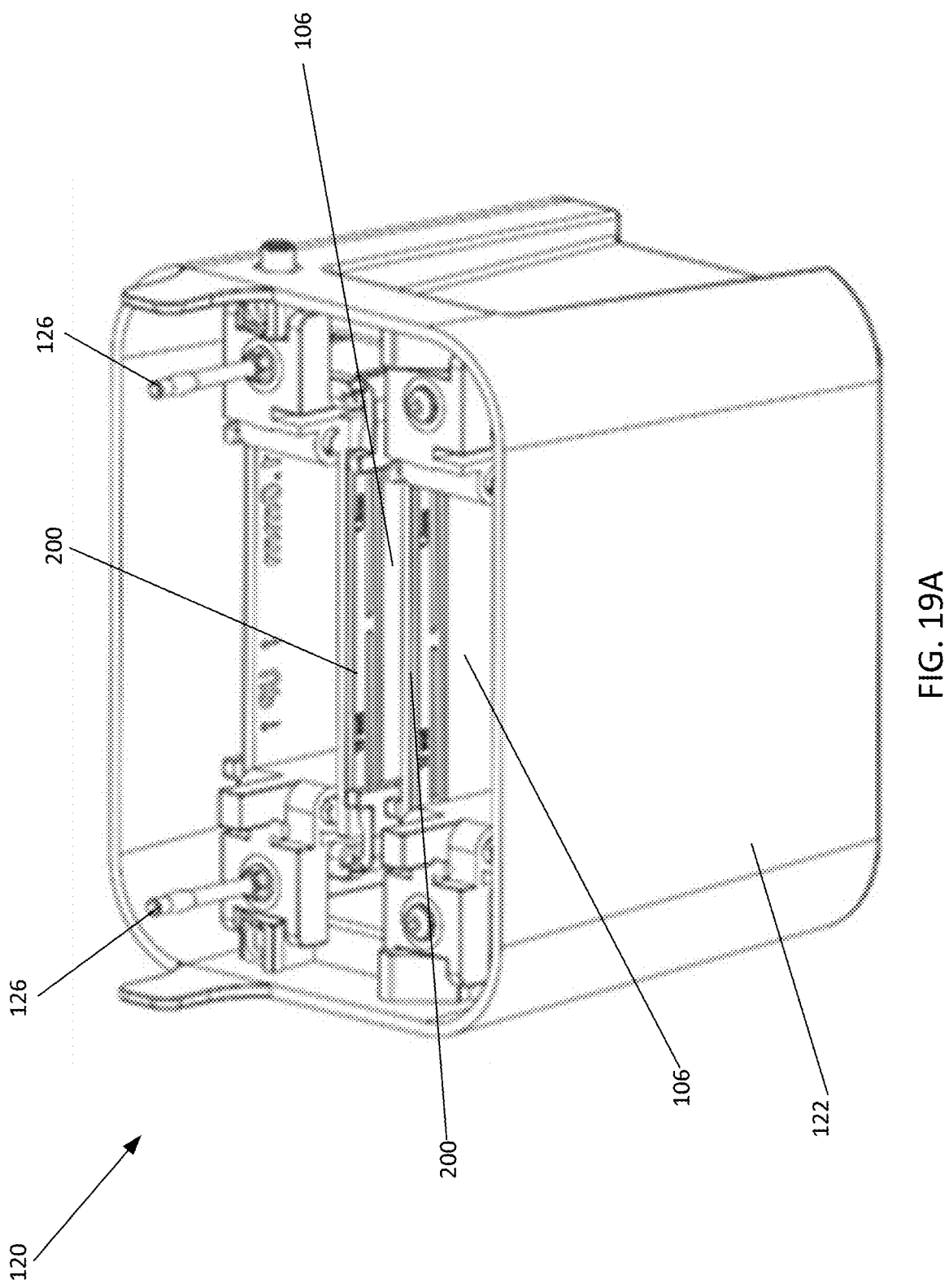
FIG. 19A illustrates a plurality of sample well combs, like that illustrated in FIGS. 4A and 4B, inserted into an electrophoresis gel that is disposed within an electrophoresis gel tank, like that illustrated in FIG. 3, where the sample well combs are not equipped with removal tools.
Figure 19B:
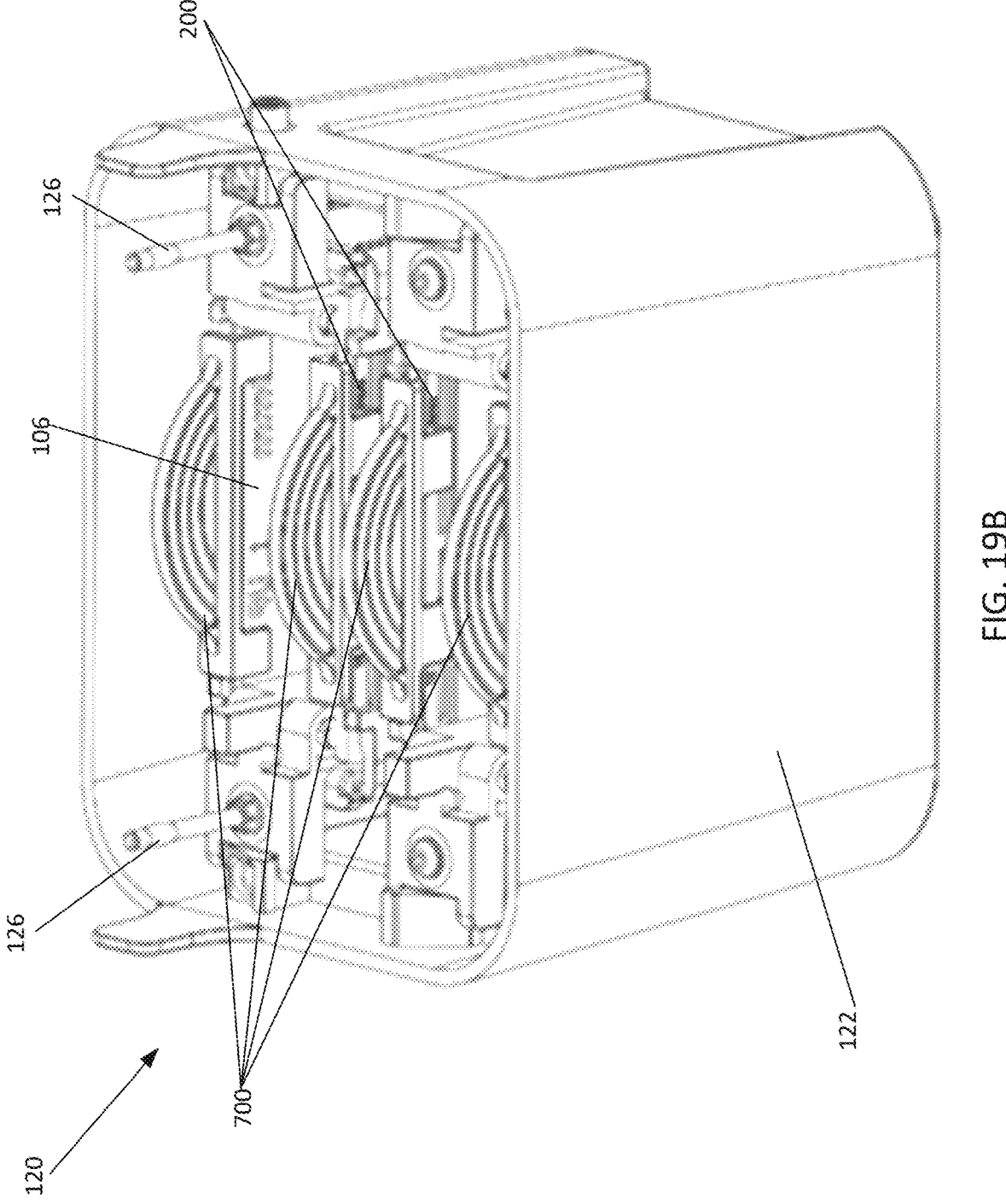
FIG. 19B illustrates a plurality of sample well combs, like that illustrated in FIGS. 4A and 4B, inserted into an electrophoresis gel that is disposed within an electrophoresis gel tank, like that illustrated in FIG. 3, where the sample well combs are equipped with the removal tool illustrated in FIG. 11.
Figure 19C:
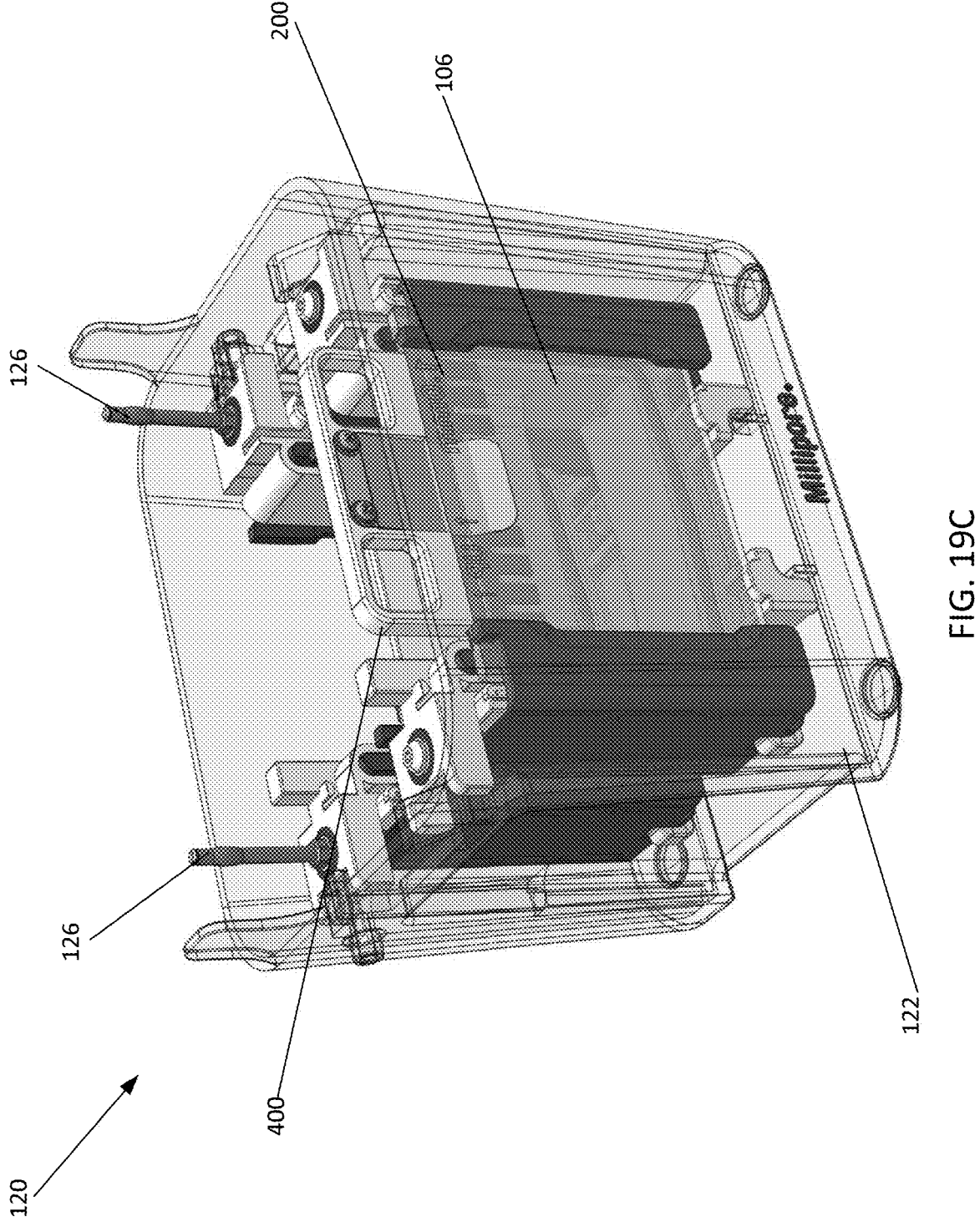
FIG. 19C illustrates a sample well comb, like that illustrated in FIGS. 4A and 4B, inserted into an electrophoresis gel that is disposed within an electrophoresis gel tank, like that illustrated in FIG. 3, where the sample well comb is equipped with the removal tool illustrated in FIGS. 6A-6G.
Figure 19D:
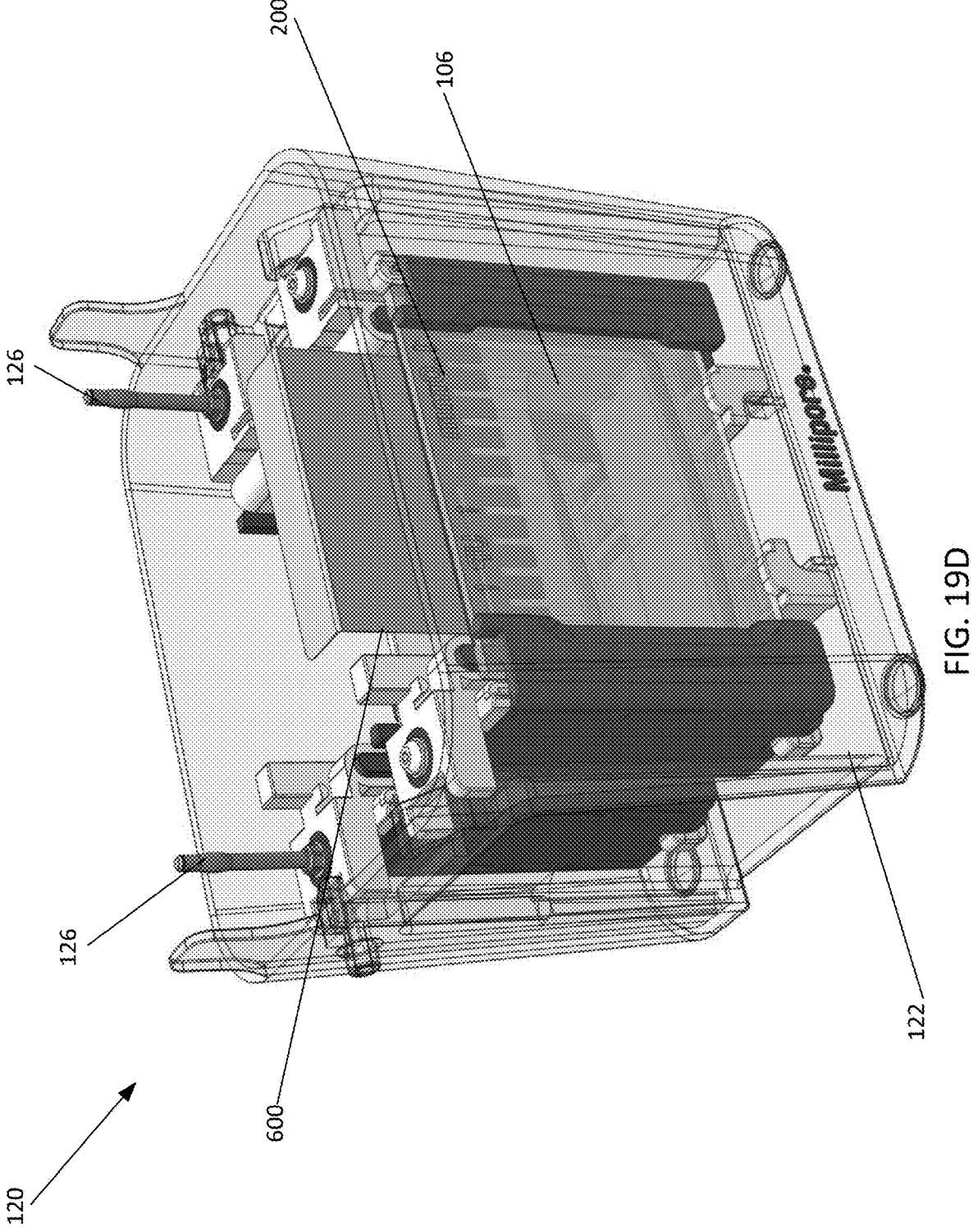
FIG. 19D illustrates a sample well comb, like that illustrated in FIGS. 4A and 4B, inserted into an electrophoresis gel that is disposed within an electrophoresis gel tank, like that illustrated in FIG. 3, where the sample well comb is equipped with the removal tool illustrated in FIGS. 9A-9G.
Figure 19E:
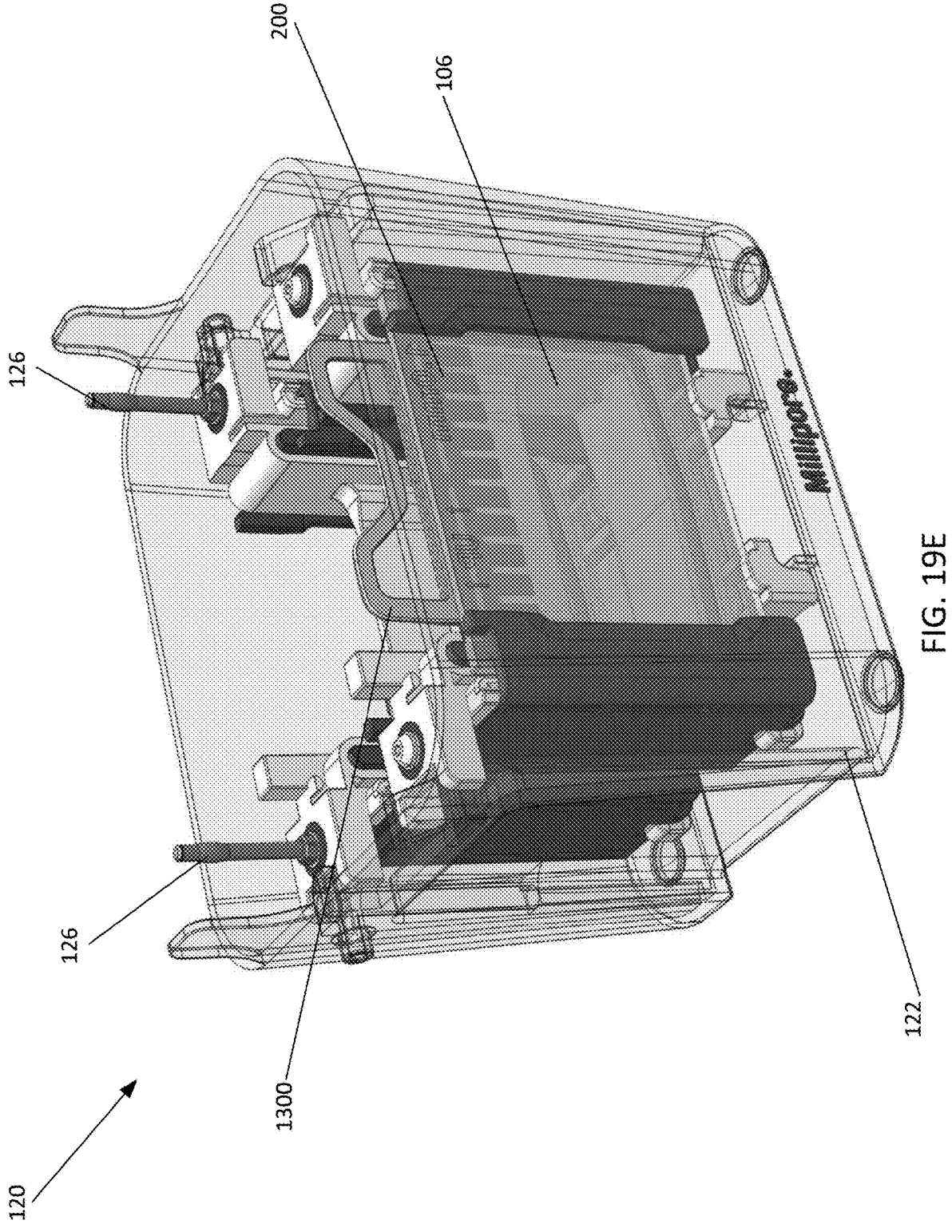
FIG. 19E illustrates a sample well comb, like that illustrated in FIGS. 4A and 4B, inserted into an electrophoresis gel that is disposed within an electrophoresis gel tank, like that illustrated in FIG. 3, where the sample well comb is equipped with the removal tool illustrated in FIGS. 18A-18G.

Turning to FIGS. 19A-19E, illustrated are views of the sample well combs 200 disposed in the electrophoresis gels that are disposed within the electrode cores 126, which, in turn, are disposed within the gel tank 122. FIG. 19A illustrates the sample well combs 200 without any removal tools. However, FIG. 19B illustrates the sample well combs 200 equipped with the removal tool 700 and illustrated in FIG. 11, while FIG. 19C illustrates the sample well comb 200 equipped with the removal tool 400 and illustrated in FIGS. 6A-6G. In addition, FIG. 19D illustrates the sample well comb 200 equipped with the removal tool 600 and illustrated in FIGS. 9A-9G, while FIG. 19E illustrates the sample well combs 200 equipped with the removal tool 1300 and illustrated in FIGS. 17A-17G. When comparing the sample well combs 200 disposed inside of a gel tank 122 without a removal tool (FIG. 19A), and the sample well combs 200 disposed inside of a gel tank 122 equipped with a removal tool 400, 600, 700, 1300 (FIGS. 19B-19E), it is easy to see how the removal tools 400, 600, 700, 1300 provide additional surface area for a user to grip in order to pull/extract the sample well comb 200 out of an electrophoresis gel. The removal tools enable a user to more easily perform a wet removal (i.e., removal of the sample well comb 200 when the electrophoresis gels are still disposed within the gel tank 122) of the sample well comb 200 by expanding the surface that may be grasped by the user, by creating a more easily graspable surface, and by exposing or raising the graspable surface above the top edge of the gel tank 122. Thus, when using the removal tools, a user may not be required to place their hands within the gel tank 122, or at least not as far into the gel tank 122, to attempt to remove the sample well comb 200 from the electrophoresis gel like that which would be required when the sample well comb is not coupled to a removal tool (e.g., like that illustrated in FIG. 19A).

The removal tools disclosed herein enable a more easy and effective removal of a sample well comb from an electrophoresis gel. The removal tool may achieve this via any number of different embodiments. As disclosed above, the removal tool may be removably coupled to the sample well comb by having a portion of the removal tool being insertable into or through the openings of the sample well comb. In some other embodiments, the removal tool may be equipped with a mechanism that serves to apply a force to a surface in order to extract the sample well comb from the electrophoresis gel. In some even further embodiments, the removal tool may be retrofitted onto, and affixed onto, the sample well comb. In all of these embodiments, the removal tool increases the surface/region/area that may be grasped or gripped by a user in order to more easily pull the sample well comb from the electrophoresis gel. The removal tool further exposes the surface/region/area, especially when coupled to the sample well comb disposed within a gel tank, that may be grasped or gripped by a user.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the removal tools presented herein may be modified to contain any number of engagement members, alignment members, handles, channels, ridges, clamp members, etc.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the bioprocessing system described herein, the manifold assembly described herein, or portions thereof may be fabricated from any suitable material or combination of materials, such as, but not limited to, thermoplastics, plastics, or metals (e.g., copper, bronze, aluminum, steel, etc.), as well as derivatives thereof, and combinations thereof. In addition, it is further to be understood that the steps of the methods described herein may be performed in any order or in any suitable manner.

Finally, when used herein, the term "comprises" and its derivations (such as "comprising," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about," "around," "generally," and "substantially."

What is claimed is:

1. A removal tool for a sample well comb, the removal tool comprising:

an upper portion defining a region to be gripped by a user;

a lower portion coupled to the upper portion, the lower portion including at least one engagement member configured to be at least partially disposed within an opening in the sample well comb to couple the removal tool to the sample well comb, wherein, when the removal tool is coupled to the sample well comb, the removal tool is configured to facilitate removal of the sample well comb from an electrophoresis gel; and a clamp member disposed on either the upper portion or the lower portion, the clamp member being configured to apply a clamping force with the at least one engagement member to an object disposed between the at least one engagement member and the clamp member.

2. The removal tool according to claim 1, wherein the removal tool is removably couplable to the sample well comb.

3. The removal tool according to claim 2, wherein the lower portion further includes an alignment member spaced from the at least one engagement member.

4. The removal tool according to claim 2, wherein the at least one engagement member includes a flange configured to be disposed within the opening of the sample well comb in order to removably couple the removal tool to the sample well comb.

5. The removal tool according to claim 2, wherein the at least one engagement member extends upwardly at an angle with respect to the upper portion and the lower portion.

6. The removal tool according to claim 1, further comprising:

a mechanism coupled to the upper portion of the removal tool, the mechanism being configured to extract the sample well comb from the electrophoresis gel.

7. The removal tool according to claim 6, wherein the mechanism is a plunger.

8. The removal tool according to claim 6, wherein the mechanism is a cam.

9. The removal tool according to claim 1, wherein the lower portion includes a first side and an opposite second side, and wherein the at least one engagement member is a projection extending outwardly from the second side of the lower portion.

10. The removal tool according to claim 9, wherein the second side is affixed to the sample well comb.

11. A removal tool for a sample well comb, the removal tool comprising:

a base portion having a first edge, a second edge, a top surface and a bottom surface;

an engagement member coupled to the first edge of the base portion and extending downwardly below the bottom surface of the base portion, the engagement member configured to be at least partially disposed within an opening in the sample well comb to couple the removal tool to the sample well comb, wherein, when the removal tool is coupled to the sample well comb, the removal tool is configured to facilitate removal of the sample well comb from an electrophoresis gel; and an alignment member coupled to the second edge of the base portion and extending downwardly below the bottom surface of the base portion, the alignment member being spaced from the engagement member.

12. The removal tool according to claim 11, wherein the engagement member includes a proximal end coupled to the first edge of the base portion and an opposite distal end that comprises a flange configured to be disposed within the opening of the sample well comb.

13. The removal tool according to claim 12, further comprising:

a plunger slidably coupled to the base portion, the plunger being configured to apply a force to a glass plate disposed in proximity to the sample well comb when the removal tool is coupled to the sample well comb in order to extract the sample well comb from the electrophoresis gel.

14. The removal tool according to claim 12, further comprising:

a cam member rotatably coupled to the base portion, the cam member being configured to apply a force to a glass plate disposed in proximity to the sample well comb when the removal tool is coupled to the sample well comb in order to extract the sample well comb from the electrophoresis gel.

15. The removal tool according to claim 12, wherein the alignment member includes a proximal end coupled to the second edge of the base portion and an opposite distal end that comprises a flange configured to be disposed within the opening of the sample well comb.

16. The removal tool according to claim 15, wherein the flange of the engagement member and the flange of the alignment member are disposed within the opening of the sample well comb simultaneously.

17. A removal tool for a sample well comb, the removal tool comprising:

a planar portion oriented substantially vertically, the planar portion comprising a first side, an opposite second side, a top edge, and a bottom edge opposite the top edge;

an engagement member coupled to the second side of the planar portion proximate to the bottom edge, the engagement member being configured to be disposed within an opening of the sample well comb when the removal tool is coupled to the sample well comb; and a handle coupled to the top edge of the planar portion.

18. The removal tool according to claim 17, wherein the engagement member is coupled to the bottom edge of the planar portion and extends upwardly at an acute angle with respect to the planar portion.

19. The removal tool according to claim 17, wherein the engagement member is a projection that extends perpendicularly from the second side of the planar portion.

20. The removal tool according to claim 17, further comprising:

a clamp member coupled to the second side of the planar portion, the clamp member being configured to apply a clamping force with the engagement member to an object disposed between the engagement member and the clamp member.

\* \* \* \* \*